US008700752B2

(12) United States Patent
Bouillet et al.

(10) Patent No.: US 8,700,752 B2
(45) Date of Patent: *Apr. 15, 2014

(54) OPTIMIZED EFFICIENT LPAR CAPACITY CONSOLIDATION

(75) Inventors: Eric Bouillet, Englewood, NJ (US); Randy Scott Johnson, O Fallon, MO (US); Tedrick Neal Northway, Wood River, IL (US); Li Zhang, Yorktown Heights, NY (US); Clea Anne Zolotow, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 1035 days.

This patent is subject to a terminal disclaimer.

(21) Appl. No.: 12/611,266

(22) Filed: Nov. 3, 2009

(65) Prior Publication Data

US 2011/0106922 A1    May 5, 2011

(51) Int. Cl.
   *G06F 15/177*    (2006.01)
(52) U.S. Cl.
   USPC ............ 709/221; 709/224; 709/225; 709/226
(58) Field of Classification Search
   USPC ......................................... 709/221, 224–226
   See application file for complete search history.

(56) References Cited

U.S. PATENT DOCUMENTS

| | | | |
|---|---|---|---|
| 6,463,454 B1 | 10/2002 | Lumelsky et al. | |
| 6,678,371 B1 | 1/2004 | Flockhart et al. | |
| 6,957,433 B2 | 10/2005 | Umberger et al. | |
| 6,973,654 B1 | 12/2005 | Shutt et al. | |
| 6,993,762 B1 | 1/2006 | Pierre | |
| 7,174,379 B2 | 2/2007 | Agarwal et al. | |
| 7,305,520 B2 * | 12/2007 | Voigt et al. | 711/112 |
| 7,523,454 B2 | 4/2009 | Romero et al. | |
| 7,565,508 B2 * | 7/2009 | Nakamura | 711/173 |
| 7,617,411 B2 * | 11/2009 | Baba et al. | 714/4.1 |
| 7,669,029 B1 * | 2/2010 | Mishra et al. | 711/170 |
| 7,673,110 B2 | 3/2010 | Yamamoto et al. | |
| 7,725,642 B2 * | 5/2010 | Tsushima et al. | 711/6 |
| 7,743,148 B2 * | 6/2010 | Ajiro | 709/226 |
| 7,849,278 B2 * | 12/2010 | Sato et al. | 711/161 |
| 7,849,347 B2 | 12/2010 | Armstrong et al. | |
| 7,877,754 B2 | 1/2011 | Birkestrand et al. | |
| 7,921,424 B2 | 4/2011 | Shutt et al. | |

(Continued)

OTHER PUBLICATIONS

Khanna et al.; Application Performance Management in Virtualized Server Environments; 10th IEEE/IFIP Network Operations and Management Symposium; Apr. 3-7, 2006; pp. 373-381.

(Continued)

*Primary Examiner* — Duyen Doan
(74) *Attorney, Agent, or Firm* — Schmeiser, Olsen & Watts; Matthew H. Chung

(57) ABSTRACT

A method and system for optimizing a configuration of a set of LPARs and a set of servers that host the LPARs. Configuration data and optimization characteristics are received. By applying the configuration data and optimization characteristics, a best fit of the LPARs into the servers is determined, thereby determining an optimized configuration. The best fit is based on a variant of bin packing or multidimensional bin packing methodology. The optimized configuration is stored. In one embodiment, comparisons of shadow costs are utilized to determine an optimal placement of the LPARs in the servers. LPAR(s) in the set of LPARs are migrated to other server(s) in the set of servers, which results in the LPARs and servers being configured in the optimized configuration.

10 Claims, 10 Drawing Sheets

(56) References Cited

U.S. PATENT DOCUMENTS

| | | | |
|---|---|---|---|
| 8,112,527 B2* | 2/2012 | Kawato | 709/226 |
| 8,244,827 B2* | 8/2012 | Abrams | 709/215 |
| 8,347,307 B2* | 1/2013 | Dawson et al. | 718/105 |
| 2002/0069369 A1 | 6/2002 | Tremain | |
| 2002/0091786 A1 | 7/2002 | Yamaguchi et al. | |
| 2002/0129127 A1* | 9/2002 | Romero et al. | 709/220 |
| 2003/0097393 A1* | 5/2003 | Kawamoto et al. | 709/1 |
| 2003/0144894 A1 | 7/2003 | Robertson et al. | |
| 2004/0088145 A1* | 5/2004 | Rosenthal et al. | 703/1 |
| 2004/0210623 A1 | 10/2004 | Hydrie et al. | |
| 2005/0044228 A1 | 2/2005 | Birkestrand et al. | |
| 2005/0198303 A1 | 9/2005 | Knauerhase et al. | |
| 2005/0228618 A1 | 10/2005 | Patel et al. | |
| 2005/0251802 A1 | 11/2005 | Bozek et al. | |
| 2005/0268298 A1* | 12/2005 | Hunt et al. | 718/1 |
| 2006/0031268 A1* | 2/2006 | Shutt et al. | 707/202 |
| 2006/0064523 A1* | 3/2006 | Moriki et al. | 710/62 |
| 2006/0136761 A1 | 6/2006 | Frasier et al. | |
| 2006/0206891 A1 | 9/2006 | Armstrong et al. | |
| 2006/0224741 A1 | 10/2006 | Jackson | |
| 2007/0027973 A1 | 2/2007 | Stein et al. | |
| 2008/0028408 A1* | 1/2008 | Day et al. | 718/104 |
| 2008/0034093 A1 | 2/2008 | Sutou | |
| 2008/0052720 A1 | 2/2008 | Barsness et al. | |
| 2008/0109813 A1 | 5/2008 | Narita et al. | |
| 2008/0256321 A1 | 10/2008 | Armstrong et al. | |
| 2008/0301487 A1* | 12/2008 | Hatta et al. | 714/3 |
| 2008/0320269 A1 | 12/2008 | Houlihan et al. | |
| 2009/0013153 A1 | 1/2009 | Hilton | |
| 2009/0133016 A1* | 5/2009 | Brown et al. | 718/1 |
| 2009/0164660 A1 | 6/2009 | Abrams | |
| 2009/0235265 A1 | 9/2009 | Dawson et al. | |
| 2010/0030877 A1* | 2/2010 | Yanagisawa | 709/221 |
| 2010/0050172 A1* | 2/2010 | Ferris | 718/1 |
| 2010/0161559 A1* | 6/2010 | Patil et al. | 707/647 |

OTHER PUBLICATIONS

Adams et al.; A Comparison of Software and Hardware Techniques for x86 Virtualization; ASPLOS '06; Oct. 21-25, 2006; 12 pages.

Alpern et al.; PDS: A Virtual Execution Environment for Software Deployment; First ACM/USENIX Conference on Virtual Execution Environments (VEE'05); Jun. 11-12, 2005; pp. 175-185.

Jones, Rob; ALSTOM Creates a Virtual World; VM World 2005; Oct. 18-20, 2005; 24 pages.

McCune et al.; Shamon: A System for Distributed Mandatory Access Control; 22nd Annual Computer Security Applications Conference; Dec. 2006; pp. 23-32.

Wood et al.; Black-box and Gray-box Strategies for Virtual Machine Migration; Proceedings of the 4th USENIX Conference on Networked Systems Design & Implementation; Apr. 2007; 14 pages.

Hill et al.; Storage & Servers; Network Computing; CMP Media Inc.; vol. 17, No. 26; Dec. 2006; pp. 39-46.

Umeno et al.; Development of Methods for Reducing the Spins of Guest Multiprocessors; Transactions of the Information Processing Society of Japan; vol. 36, No. 3; Mar. 1995; pp. 681-696.

Office Action (Mail Date Nov. 16, 2009) for U.S. Appl. No. 11/960,629, filed Dec. 19, 2007.

Amendment filed Jan. 21, 2010 in response to Office Action (Mail Date Nov. 16, 2009) for U.S. Appl. No. 11/960,629, filed Dec. 19, 2007.

Final Office Action (Mail Date Mar. 29, 2010) for U.S. Appl. No. 11/960,629, filed Dec. 19, 2007.

Notice of Appeal filed Jun. 3, 2010 in response to Final Office Action (Mail Date Mar. 29, 2010) for U.S. Appl. No. 11/960,629, filed Dec. 19, 2007.

Appeal Brief filed Jul. 12, 2010 in response to Final Office Action (Mail Date Mar. 29, 2010) for U.S. Appl. No. 11/960,629, filed Dec. 19, 2007.

Office Action (Mail Date Oct. 7, 2010) for U.S. Appl. No. 11/960,629, filed Dec. 19, 2007.

Amendment filed Jan. 7, 2011 in response to Office Action (Mail Date Oct. 7, 2010) for U.S. Appl. No. 11/960,629, filed Dec. 19, 2007.

Office Action (Mail Date May 12, 2011) for U.S. Appl. No. 11/960,629, filed Dec. 19, 2007.

Amendment filed Aug. 12, 2011 in response to Office Action (Mail Date May 12, 2011) for U.S. Appl. No. 11/960,629, filed Dec. 19, 2007.

Final Office Action (Mail Date Dec. 14, 2011) for U.S. Appl. No. 11/960,629, filed Dec. 19, 2007.

Notice of Appeal filed Feb. 13, 2012 in response to Final Office Action (Mail Date Dec. 14, 2011) for U.S. Appl. No. 11/960,629, filed Dec. 19, 2007.

Appeal Brief filed Feb. 23, 2012 in response to Final Office Action (Mail Date Dec. 14, 2011) for U.S. Appl. No. 11/960,629, filed Dec. 19, 2007.

Notice of Allowance (Mail Date Apr. 5, 2012) for U.S. Appl. No. 11/960,629, filed Dec. 19, 2007.

Office Action (Mail Date Aug. 18, 2011) for U.S. Appl. No. 12/046,759, filed Mar. 12, 2008.

Amendment filed Nov. 18, 2011 in response to Office Action (Mail Date Aug. 18, 2011) for U.S. Appl. No. 12/046,759, filed Mar. 12, 2008.

Final Office Action (Mail Date Jan. 20, 2012) for U.S. Appl. No. 12/046,759, filed Mar. 12, 2008.

Amendment After Final filed Apr. 4, 2012 in response to Final Office Action (Mail Date Jan. 20, 2012) for U.S. Appl. No. 12/046,759, filed Mar. 12, 2008.

Advisory Action (Mail Date Apr. 4, 2012) for U.S. Appl. No. 12/046,759, filed Mar. 12, 2008.

Notice of Appeal filed Apr. 10, 2012 in response to Advisory Action (Mail Date Apr. 4, 2012) for U.S. Appl. No. 12/046,759, filed Mar. 12, 2008.

Appeal Brief filed Jun. 11, 2012 in response to Advisory Action (Mail Date Apr. 4, 2012) for U.S. Appl. No. 12/046,759, filed Mar. 12, 2008.

Notice of Allowance (Mail Date Aug. 20, 2012) for U.S. Appl. No. 12/046,759, filed Mar. 12, 2008.

* cited by examiner

OPTIMIZED EFFICIENT LPAR CAPACITY CONSOLIDATION

FIELD OF THE INVENTION

The present invention relates to a data processing method and system for efficient logical partition (LPAR) capacity consolidation, and more particularly to a technique for determining an optimized configuration of LPARs and physical servers that host the LPARs.

BACKGROUND OF THE INVENTION

Conventional LPAR capacity consolidation systems inefficiently rely exclusively on processor utilization as a metric, thereby failing to account for other properties and allowing an insufficient number of LPARs or an excessive number of LPARs to be included in a virtualization of a computing system (i.e., an undersubscription or an oversubscription, respectively, of the physical properties of the computing system from an architectural point of view). When undersubscribed, the server is underutilized and is wasted. When oversubscribed, the server is overutilized and the customer's service is negatively impacted. Thus, there exists a need to overcome at least one of the preceding deficiencies and limitations of the related art.

SUMMARY OF THE INVENTION

In a first embodiment, the present invention provides a computer-implemented method of optimizing a configuration of a plurality of LPARs and a plurality of server computer systems (servers) that host the LPARs. The method of the first embodiment comprises:

receiving configuration data that describes an enterprise configuration of the plurality of LPARs and the plurality of servers;

receiving optimization characteristic data that describes one or more characteristics on which an optimized version of the enterprise configuration (optimized enterprise configuration) is to be based;

a processor of a computer determining the optimized enterprise configuration by determining a best fit of the LPARs into the servers based on a bin packing methodology that applies the configuration data and the optimization characteristic data;

storing the optimized enterprise configuration; and migrating one or more LPARs of the plurality of LPARs to one or more servers of the plurality of servers, wherein a result of the step of migrating is the plurality of LPARs and the plurality of servers being configured in the optimized enterprise configuration.

In a second embodiment, the present invention provides a computer-implemented method of determining an optimal configuration of a plurality LPARs and a plurality of servers that host the LPARs. The method of the second embodiment comprises:

a processor of a computing system determining a draft configuration of the plurality of LPARs and the plurality of servers is a tentative version of the optimal configuration of the plurality of LPARs and the plurality of servers by performing an iteration of a first loop, wherein performing the iteration of the first loop includes iteratively evaluating LPARs from a list of n LPARs in a second loop, and wherein the tentative version of the optimal configuration has a tentative final total cost;

determining no other draft configuration resulting from one or more additional iterations of the second loop or one or more additional iterations of the first loop has a draft total cost less than the tentative final total cost of the tentative version of the optimal configuration;

in response to determining no other draft configuration has the draft total cost less than the tentative final total cost, saving the tentative version of the optimal configuration as a final version of the optimal configuration of the plurality of LPARs and the plurality of servers; and migrating one or more LPARs of the plurality of LPARs to one or more servers of the plurality of servers so that the plurality of LPARs and the plurality of servers are configured in the final version of the optimal configuration.

Systems, program products and processes for supporting computing infrastructure corresponding to the above-summarized methods are also described herein.

The present invention provides a technique for efficient LPAR capacity consolidation. Further, the present invention may provide energy efficiency by determining a minimum number of physical servers to support all required LPARs, an optimization of computer room floor space that reduces energy requirements, and an optimization of server equipment that favors energy efficient models. Still further, the optimized configuration provided by the present invention may reduce requirements for equipment, power, floor space, cost and support personnel costs. Further yet, the optimal configuration provided by the present invention may enhance standardization efforts when appropriate priorities are established.

DETAILED DESCRIPTION OF THE INVENTION

Overview

Embodiments of the present invention determine a physical server inventory that accommodates LPARs (i.e., all LPARs in a system) in an optimized configuration so that a total resource utilization of the LPARs collocated on any of the physical servers does not exceed a total capacity of the physical server in any time interval. The optimization may take place in multiple dimensions (e.g., processor, memory, power requirements, footprint (i.e., floor space), equipment cost, etc.), each dimension optimized and prioritized to identify the best fit of available resources for the resources required by the LPARs. The multi-dimensional optimization may employ an N-dimensional cube, where the optimal configuration is the intersection of the N dimensions in prioritized order. In one embodiment, the present invention uses shadow costs to identify the real costs of LPAR reconfiguration and to allow identification of the optimized configuration.

A set of LPARs whose configuration is optimized by embodiments of the present invention is characterized by individual resource requirements, such as memory and central processing unit (CPU) requirements. Further, a set of physical server platforms whose configuration is optimized by embodiments of the present invention is characterized by individual resource availability and cost. The LPAR resource requirements are specified at given time intervals. The time interval may have arbitrary length, but the intervals are the same for all the LPARs. For an additional cost, it is possible to upgrade the physical server resources, within a maximum capacity limit per resource and per server, at the beginning of the first time interval. As used herein, the operating cost is defined as the cost of the physical server and server upgrades, including prorated power costs and costs associated with reconfiguring the current LPAR allocation.

The capacity consolidation provided by embodiments of the present invention utilizes a variant of a solution to the bin packing problem, or a variant to the multidimensional bin packing problem if the number of resource types is greater than one. Although the bin packing and multidimensional bin packing problems can be solved efficiently with general purpose integer optimization tools, such tools do not scale well for larger problem sizes. Further, because the bin packing and multidimensional bin packing problems are each known to be a combinatorial NP-hard problem, the most efficient known algorithms use heuristics (e.g., First Fit, First Fit Decreasing, Best Fit, and Best Fit Decreasing) to provide fast and very good, but often non-optimal solutions. The variants of solutions to the bin packing and multidimensional bin packing problems disclosed herein provide an optimized solution (i.e., an optimized configuration of LPARs and servers that host the LPARs).

System for Determining an Optimized Configuration of Lpars and Servers

Figure 1:
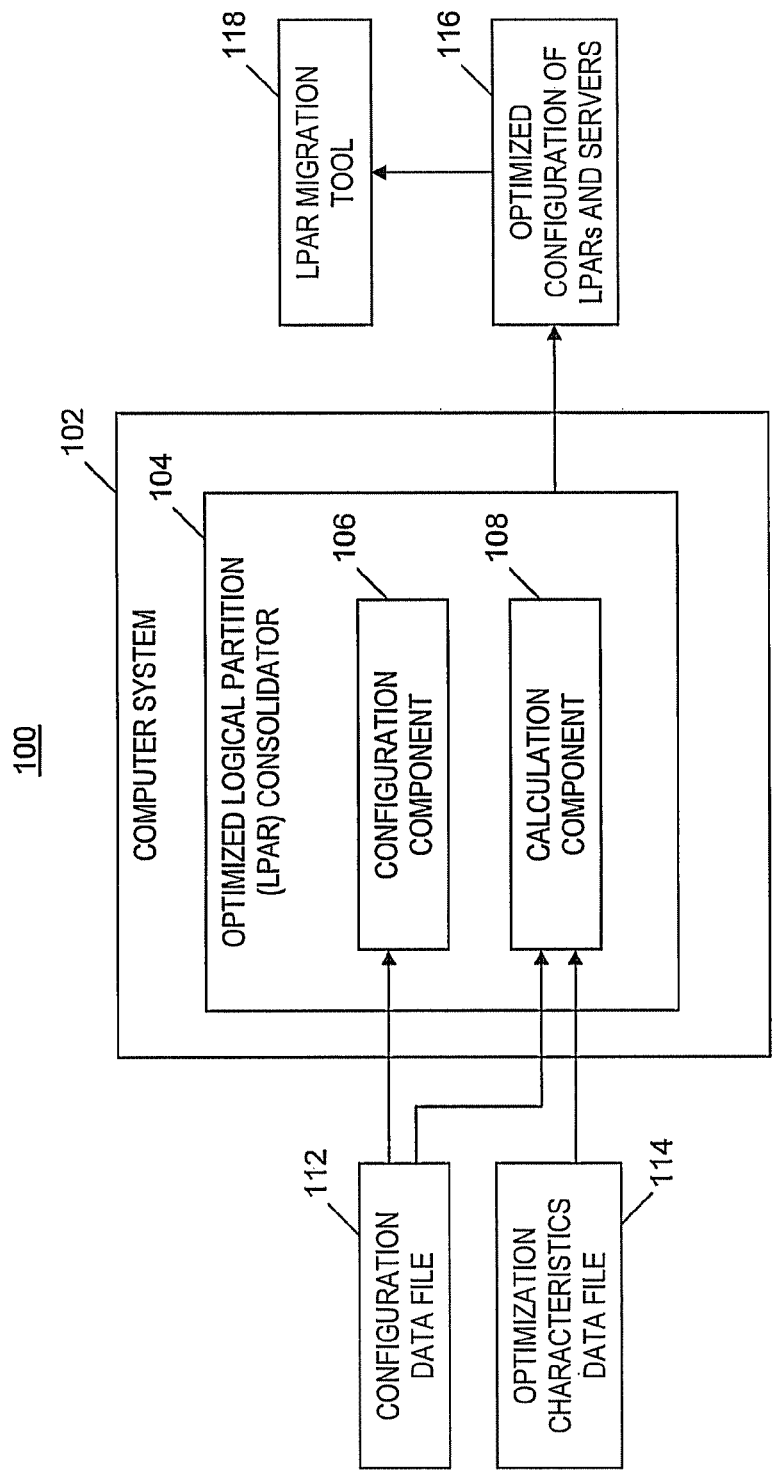
FIG. 1 is a block diagram of a system for determining an optimized configuration of LPARs and servers, in accordance with embodiments of the present invention.

FIG. 1 is a block diagram of a system for determining an optimized configuration of LPARs and servers, in accordance with embodiments of the present invention. System 100 includes a computer system 102, which includes an optimized LPAR consolidator 104. Optimized LPAR consolidator 104 includes a configuration component 106 and a calculation component 108. Optimized LPAR consolidator 104 includes logic for optimizing a configuration of a set of LPARs and a set of server computer systems (a.k.a. servers) that host the LPARs. Configuration component 106 receives a configuration data file 112 from a computer data storage unit (not shown). Configuration data file 112 includes configuration data for the set of LPARs and set of servers whose configuration is optimized by optimized LPAR consolidator 104. The configuration data may include the number and types of LPARs in the set of LPARs and the resources required for each LPAR, the number and types of servers in the set of servers, the resources available on each server, and the initial configuration of the LPARs and the servers. In one embodiment, each LPAR in the set of LPARs is a virtualized logical partition of a computing resource (i.e., each LPAR is a subset of a physical frame and a logical CPU).

Calculation component 108 receives the aforementioned configuration data and data from an optimization characteristics data file 114 from one or more computer data storage units (not shown). Optimization characteristics data file 114 may include optimization dimensions and a prioritization of the optimization dimensions. For example, optimization characteristics data file may include the following requirements: processor, memory, power, footprint (i.e., floor space), and/or equipment cost.

Using calculations provided by calculation component 108, where the calculations are based on the optimization dimensions and the prioritization retrieved from optimization characteristics data file 114, optimized LPAR consolidator 104 generates an optimized configuration 116 of the LPARs and the servers that host the LPARs. Optimized LPAR consolidator 104 sends the optimized configuration 116 to an LPAR migration tool 118. LPAR migration tool 118 manages migration(s) so that the set of LPARs and the set of servers are configured according to the optimized configuration 116. Each migration is a movement of an LPAR from one server to another server. Instructions of program code included in LPAR migration tool 118 may be carried out by computer system 102 or by another computer system (not shown).

In one embodiment, calculation component 108 sends optimized configuration 116 to a non-automated LPAR migration tool 118, which presents the optimized configuration to a user. The user analyzes optimized configuration 116 and specifies migrations via LPAR migration tool 118.

In another embodiment, a post-processing component (not shown) is included in optimized LPAR consolidator 104 and the LPAR migration tool 118 is an automated tool that receives the optimized configuration 116 and automatically performs the migrations necessary to place the LPARS and servers in a configuration that conforms to the optimized configuration. Before the post-processing component sends the optimized configuration 116 to the LPAR migration tool 118, the post-processing component formats the optimized configuration so that the output of system 100 (i.e., the optimized configuration) can be used by the LPAR migration tool.

Processes for Determining an Optimized Configuration of Lpars and Servers

Figure 2:
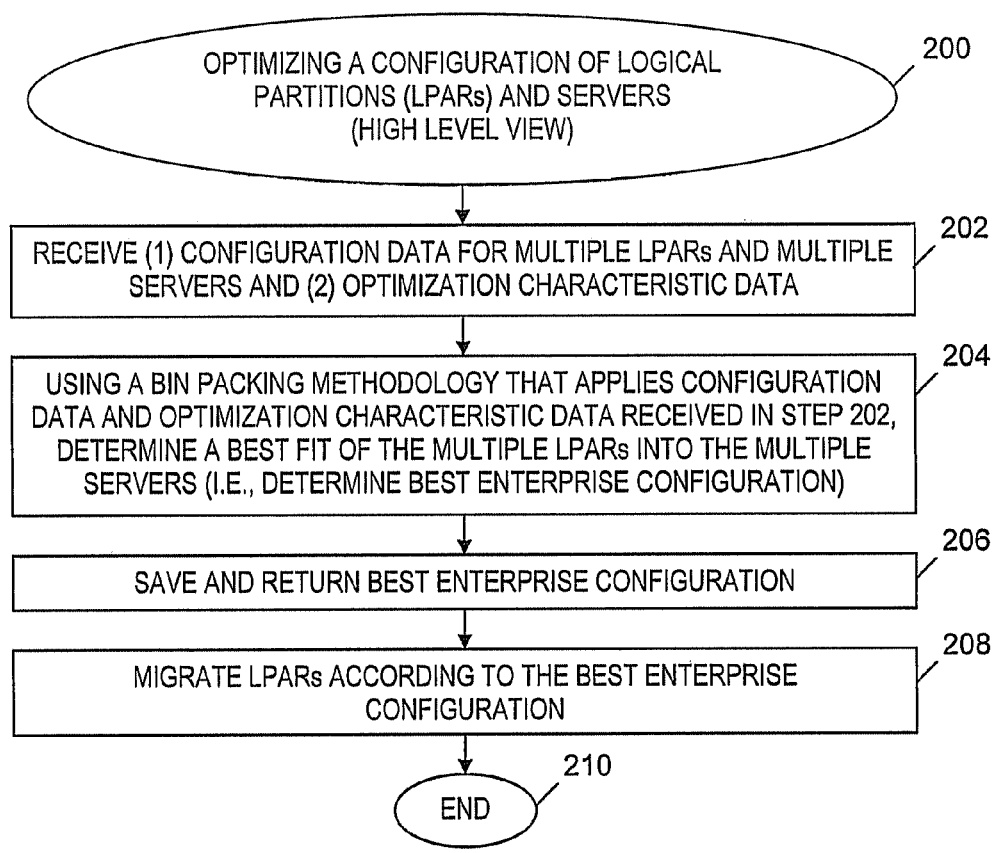
FIG. 2 is a flowchart of a high level view of a process for determining an optimized configuration of LPARs and servers, where the process is capable of being implemented in the system of FIG. 1, in accordance with embodiments of the present invention.

FIG. 2 is a flowchart of a high level view of a process for determining an optimized configuration of LPARs and servers, where the process is capable of being implemented in the system of FIG. 1, in accordance with embodiments of the present invention. The process of FIG. 2 begins at step 200. In step 202, optimized LPAR consolidator 104 (see FIG. 1) receives configuration data for each LPAR in a set of LPARs and for each server in a set of servers. The configuration data specifies the initial configuration of the LPARs and the servers, which includes specifying the resources required by the LPARs, the resources of the servers that are available to be used by LPARs, and which server hosts each LPAR. In step 202, optimized LPAR consolidator 104 (see FIG. 1) also receives optimization characteristics data that specifies parameters used to determine an optimized configuration of the LPARs and servers.

In one embodiment, the configuration data received in step 202 is received by configuration component 106 (see FIG. 1) and stored in configuration data file 112 (see FIG. 1). In one embodiment, the configuration data received in step 202 includes the number and types of LPARs in the set of LPARs and the resources required for each LPAR, the number and types of servers in the set of servers, the type and amount of resources available on each server, and the initial configuration of the LPARs and the servers, where the initial configuration indicates which server hosts each LPAR.

In one embodiment, the optimization characteristics data received in step 202 is stored in optimization characteristics data file 114 (see FIG. 1). In one embodiment, the optimization characteristics data received in step 202 includes optimization dimensions (e.g., requirements for processor, memory, power, footprint (i.e., floor space) and equipment cost) and a prioritization of the optimization dimensions.

In step 204, LPAR consolidator 104 (see FIG. 1) uses a bin packing methodology that applies the configuration data and optimization characteristics data received in step 202 to determine a best enterprise configuration (i.e., optimized configuration 116 in FIG. 1). That is, LPAR consolidator 104 (see FIG. 1) determines a best fit of the LPARs into the servers that host the LPARs. In one embodiment, optimized LPAR consolidator 104 (see FIG. 1) employs a vector packing technique for solving a multidimensional bin packing problem, where resource capacity constraints must be satisfied individually on each resource type. In another embodiment, optimized LPAR consolidator 104 (see FIG. 1) employs a rectangular packing technique to solve the multidimensional bin packing problem (i.e., representing the resource types as the sides of an n-dimensional cube, and fitting cubes formed by LPAR resource utilizations into the cube formed by the receiving server without any of the cubes formed by the LPAR resource utilizations overlapping).

In one embodiment, step 204 employs a variant of a solution to a bin packing or multidimensional bin packing problem, where the variant utilizes shadow costs determined by a shadow cost function. The shadow cost function and how shadow costs are used to determine an optimal placement of an LPAR in a target server are described below in the Shadow Costs section.

In step 206, LPAR consolidator 104 (see FIG. 1) saves and returns the best enterprise configuration determined in step 204.

In step 208, one or more LPARs are migrated (i.e., moved) to one or more servers, where each migration of an LPAR is a movement of the LPAR from a server that hosts the LPAR in the initial configuration to another server that hosts the LPAR in the best enterprise configuration determined in step 204. In step 210, the process of FIG. 2 ends. One embodiment that provides a more detailed view of the process of FIG. 2 is depicted in FIGS. 3A-3C.

Figure 3A:
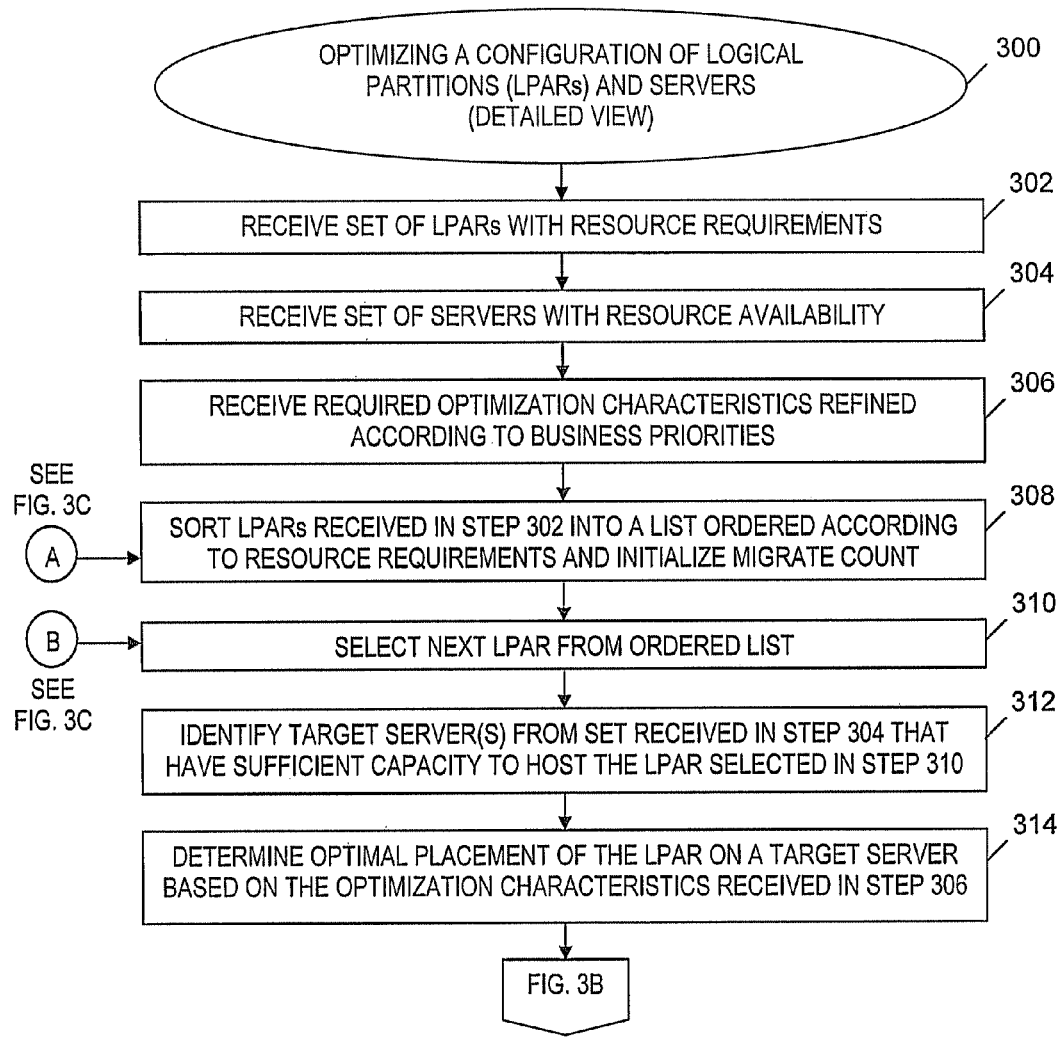
FIGS. 3A-3C depict a flowchart of a detailed view of a process for determining an optimized configuration of LPARs and servers, where the process is capable of being implemented in the system of FIG. 1, in accordance with embodiments of the present invention.
Figure 3B:
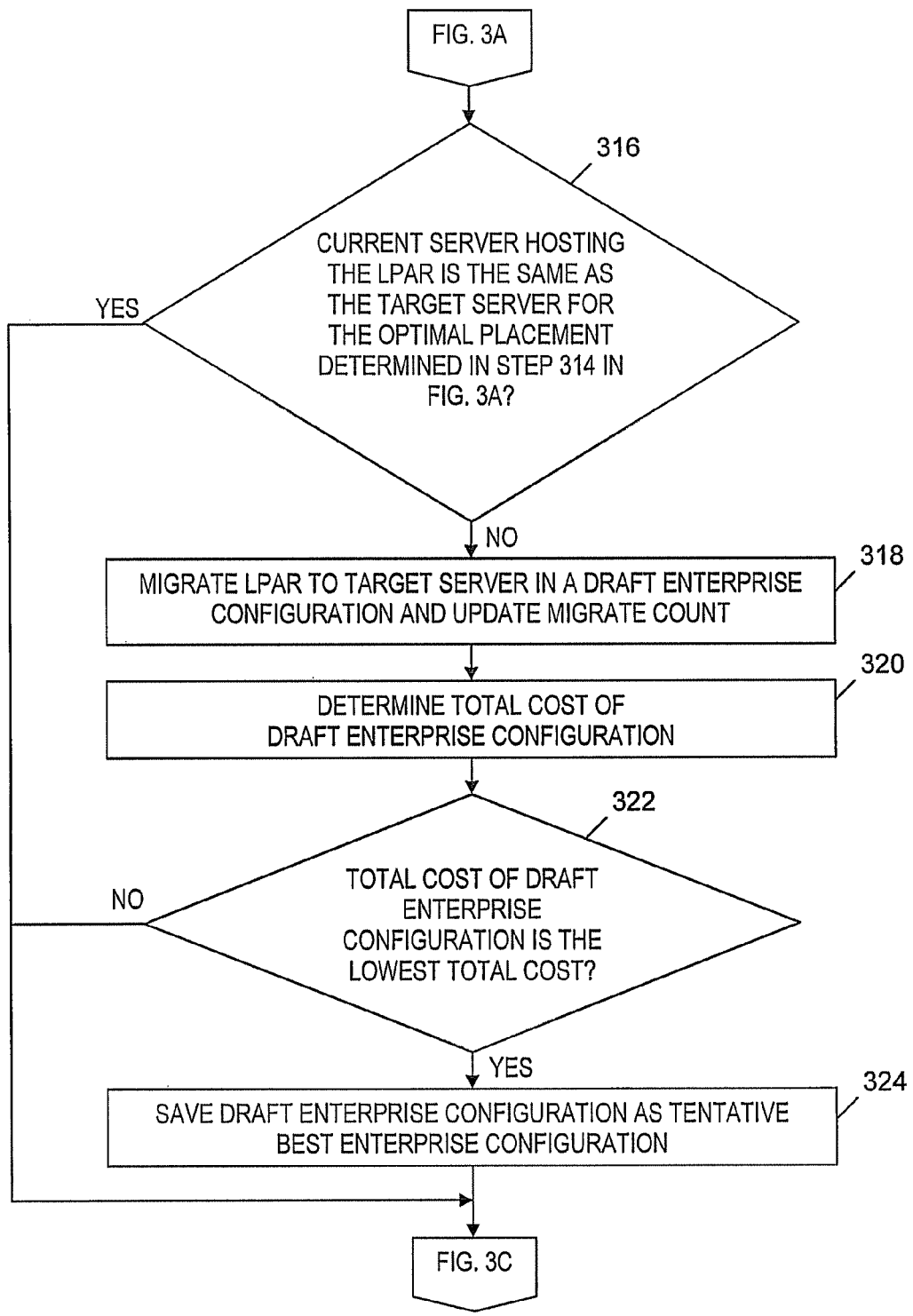
Figure 3C:
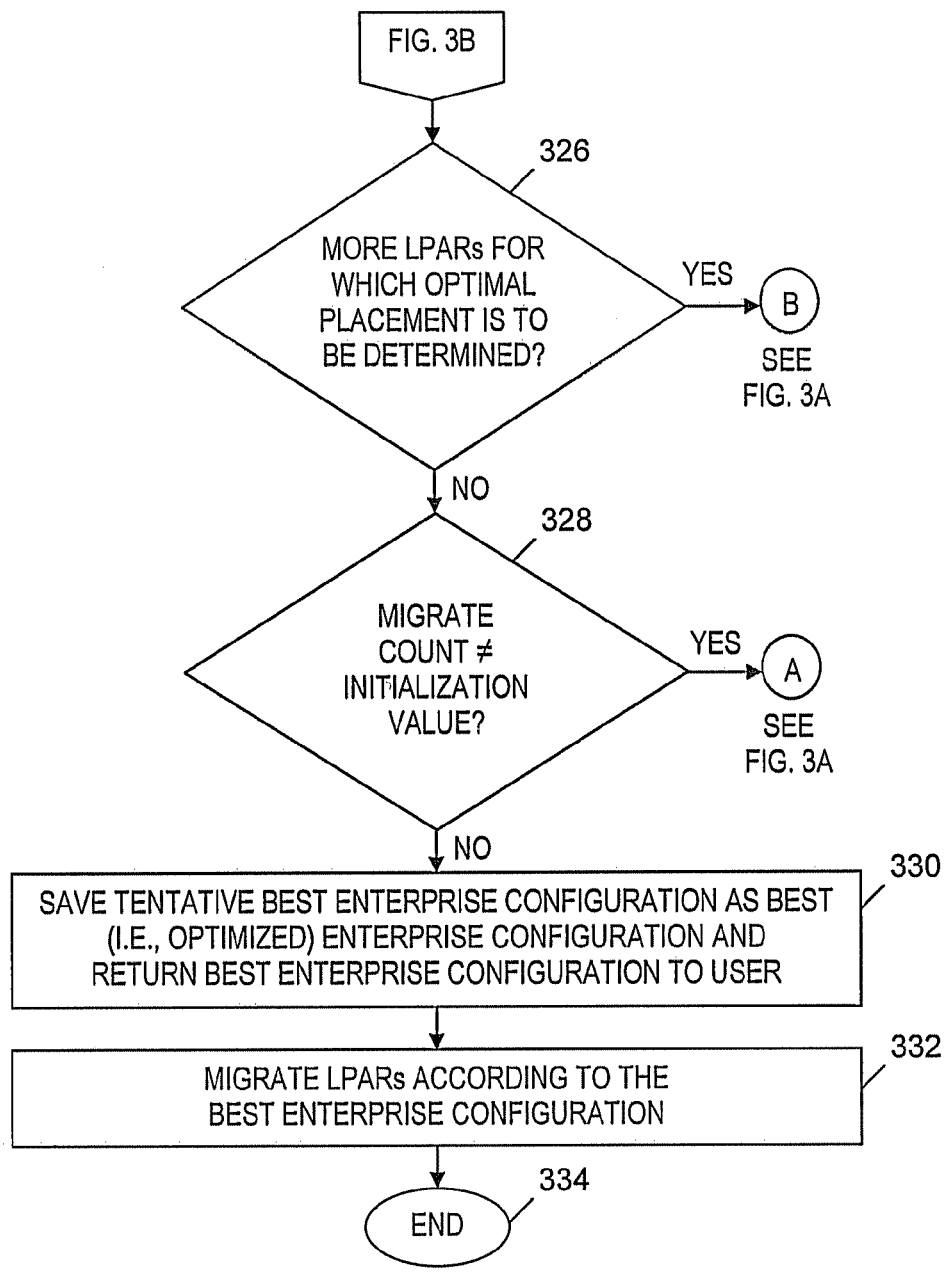

FIGS. 3A-3C depict a flowchart of a detailed view of a process for determining an optimized configuration of LPARs and servers, where the process is capable of being implemented in the system of FIG. 1, in accordance with embodiments of the present invention. The process of FIGS. 3A-3C begins at step 300 in FIG. 3A. In step 302, configuration component 106 (see FIG. 1) receives a specification of a set of LPARs, which includes identifications of LPARs in the set of LPARs and LPAR configuration data that specifies resource requirements of the identified LPARs. In one embodiment, the configuration data received in step 302 includes the number and types of LPARs in the set of LPARs and the resources required for each LPAR. The identifications of the LPARs and the LPAR configuration data may be received in step 302 in one more documents previously created by a user of system 100 (see FIG. 1).

In step 304, configuration component 106 (see FIG. 1) receives a specification of a set of servers, which includes identifications of servers in the set of servers and server configuration data that specifies resources in each server that are available to LPARs. In one embodiment, the server configuration data received in step 304 includes the number and types of servers in the set of servers, the type and amount of resources available on each server. The configuration data received in steps 302 and 304 specify the initial current configuration of the LPARs and the servers (i.e., a configuration that specifies for each LPAR in the set of LPARs a corresponding server that hosts the LPAR prior to determining an optimized configuration). The identifications of the servers and the server configuration data may be received in step 304 in one more documents previously created by a user of system 100 (see FIG. 1).

In step 306, optimized LPAR consolidator 104 (see FIG. 1) receives required optimization characteristics. The received required optimization characteristics are stored in optimization characteristics data file 114 (see FIG. 1). Prior to being received in step 306, the optimization characteristics are refined according to predefined criteria based on business priorities.

In one embodiment, the configuration component 106 (see FIG. 1) receives the required optimization characteristics in step 306 and saves the required optimization characteristics in optimization characteristics file 114 (see FIG. 1). In one embodiment, calculation component 108 (see FIG. 1) retrieves optimization characteristics from optimization characteristics data file 114 (see FIG. 1) in step 306. In one embodiment, the optimization characteristics received in step 306 includes optimization dimensions (e.g., requirements for processor, memory, power, footprint (i.e., floor space) and equipment cost) and a prioritization of the optimization dimensions. Calculation component 108 (see FIG. 1) utilizes the optimization dimensions and the prioritization of the dimensions to determine a best enterprise configuration of the LPARs and the servers in the remaining steps of the process of FIGS. 3A-3C. Prior to step 306, the optimization dimensions and prioritization may be specified by a user of system 100 (see FIG. 1).

In one embodiment, step 306 includes receiving an adjustment of a shadow cost function that weighs the received optimization dimensions according to the received prioritization. Shadow costs and the shadow cost function are described below in the Shadow Costs section.

In step 308, calculation component 108 (see FIG. 1) sorts the LPARs received in step 302 to generate a list ordered according to the resources required by the LPARs (i.e., according to the resource requirements included in the configuration data received in step 302). In one embodiment, the list of LPARs generated in step 308 is sorted in a decreasing order according to a measure of the resources required by each LPAR. Hereinafter in the discussion of FIGS. 3A-3C, the list of LPARs generated in step 308 is referred to as "the ordered list." Step 308 also includes setting a migrate count to an initialization value (e.g., initializes the migrate count to zero).

In step 310, calculation component 108 (see FIG. 1) selects a next LPAR from the ordered list (i.e., the next LPAR in the ordered list that has not yet been processed by the loop starting at step 310).

In step 312, calculation component 108 (see FIG. 1) identifies one or more target servers. The one or more target servers identified in step 312 are the server(s) in the set of servers identified in step 304 that have sufficient resource capacity to host the LPAR selected in step 310.

In step 314, calculation component 108 (see FIG. 1) determines an optimal placement of the LPAR selected in step 310 by identifying a target server of the target server(s) identified in step 312, where the optimal placement indicates that the LPAR is to be migrated (i.e., moved) to the identified target server. The determination of the optimal placement in step 314 is based on the optimization characteristics received in step 306 and the configuration data received in steps 302 and 304.

In one embodiment, the determination of the optimal placement in step 314 is based on a determination of shadow costs calculated by a shadow cost function. The shadow cost function may utilize the optimization characteristics received in step 306 and the configuration data received in steps 302 and 304. In one embodiment, the shadow costs are used to determine net shadow cost savings between a current configuration and a configuration resulting from migrating the LPAR to a target server, thereby indicating an accurate cost of migrating the LPAR to the target server. Shadow costs and the shadow cost function are described below in the discussion of FIG. 4. Shadow costs and how shadow costs are described below in the Shadow Costs section.

After step 314, the process of FIGS. 3A-3C continues in FIG. 3B. If calculation component 108 (see FIG. 1) determines in inquiry step 316 that the server currently hosting the LPAR selected in step 310 (see FIG. 3A) is not the same as the target server identified in step 314 (see FIG. 3A), then the No branch of step 316 is taken and step 318 is performed. In one embodiment, the No branch of step 316 is taken if the lowest shadow cost for the LPAR is calculated for a target server that is not the same as the server on which the LPAR is currently hosted.

In step 318, calculation component 108 (see FIG. 1) determines a draft enterprise configuration to include the result of a proposed migration of the LPAR selected in step 310 (see FIG. 3A) to the target server identified in step 314 (see FIG. 3A). In step 318, the calculation component 108 (see FIG. 1) stores the draft enterprise configuration in memory of computer system 102 (see FIG. 1) or in a computer data storage unit. Step 318 also includes calculation component 108 (see FIG. 1) updating the migrate count (e.g., incrementing the migrate count) to indicate the migration of the LPAR to the target server to generate the draft enterprise configuration. The draft enterprise configuration is a configuration that is updated during the iterative loop starting at step 310 (see FIG. 3A), and may be saved as a tentative version of the best enterprise configuration (a.k.a. tentative best enterprise configuration or tentative optimal configuration) based on the total cost, as described below relative to steps 320, 322 and 324.

In step 320, calculation component 108 (see FIG. 1) determines a total cost of the draft enterprise configuration determined in step 318 (i.e., a total cost is updated based on the LPAR migrating to the target server and ongoing cost).

If calculation component 108 (see FIG. 1) determines in inquiry step 322 that the total cost of the draft enterprise configuration (i.e., the total cost determined in step 320) is the lowest total cost as compared to the total cost(s) of any draft enterprise configuration(s) determined in all previous iteration(s) of the loop that starts at step 310 (see FIG. 3A), then the Yes branch of step 322 is taken and step 324 is performed. The Yes branch of step 322 is also taken if the current iteration of the loop starting at step 310 (see FIG. 3A) is the first iteration of that loop.

In step 324, calculation component 108 (see FIG. 1) determines a tentative version of a best enterprise configuration (i.e., a tentative version of an optimal configuration of the LPARs and servers identified in steps 302 and 304 in FIG. 3A) by saving the draft enterprise configuration determined in step 318 as the tentative version of the best enterprise configuration. After step 324, the process of FIGS. 3A-3C continues with step 326 in FIG. 3C.

Returning to step 316, if calculation component 108 (see FIG. 1) determines that the server currently hosting the LPAR selected in step 310 (see FIG. 3A) is the same as the target server identified in step 314 (see FIG. 3A), then the Yes branch of step 316 is taken and step 326 in FIG. 3C is performed. In one embodiment, the Yes branch of step 316 is taken if the lowest shadow cost for the LPAR is calculated for a target server that is the same as the server on which the LPAR is currently hosted.

Returning to step 322, if calculation component 108 (see FIG. 1) determines that the total cost of the draft enterprise configuration is not the lowest total cost as compared to total cost(s) of draft enterprise configuration(s) determined in previous iteration(s) of the loop that starts at step 310 (see FIG. 3A), then the No branch of step 322 is taken and step 326 in FIG. 3C is performed.

Step 326 in FIG. 3C follows the Yes branch of step 316, the No branch of step 322, and step 324 in FIG. 3B. If calculation component 108 (see FIG. 1) determines in inquiry step 326 that there are one or more LPARs remaining in the ordered list for which the optimal placement in step 314 (see FIG. 3A) has not yet been determined, then the Yes branch of step 326 is taken and the process repeats starting with a next LPAR being selected from the ordered list at step 310 (see FIG. 3A).

If calculation component 108 (see FIG. 1) determines in inquiry step 326 that all LPARs in the ordered list have been optimally placed in step 314 (see FIG. 3A), then the No branch of step 326 is taken and inquiry step 328 is performed. Taking the No branch of step 326 indicates that the tentative best enterprise configuration cannot be improved further in the current iteration of the loop that starts at step 308 (see FIG. 3A).

If calculation component 108 (see FIG. 1) determines in inquiry step 328 that the migrate count has been updated from its initialization value (e.g., migrate count is greater than zero) (i.e., at least one LPAR was the subject of a proposed migration in the most recent set of iterations of the loop starting at step 310 in FIG. 3A), then the Yes branch of step 328 is taken and the process repeats starting at step 308 (see FIG. 3A) using the tentative best enterprise configuration as input to the next iteration of the loop starting at step 308 (see FIG. 3A). That is, in the next iteration starting at step 308 (see FIG. 3A), the tentative best enterprise configuration is the current configuration, the LPARs in the current configuration are sorted into the ordered list (e.g., in decreasing resource requirement order), and the migrate count is re-set to the initialization value (e.g., re-set the migrate count to zero).

Iterations of the loop starting at step 308 (see FIG. 3A) continue until there is an iteration in which no LPARs are the subject of proposed migrations in step 318 (i.e., the Yes branch of step 316 is always taken in the iteration, the draft enterprise configuration is not updated in step 318, and the migrate count retains its initialization value). No proposed migrations in an iteration of the loop starting at step 308 (see FIG. 3A) results in the tentative best enterprise configuration being the best enterprise configuration (see step 330) having a minimized cost of servers, migrations, and resources.

If calculation component 108 (see FIG. 1) determines in inquiry step 328 that the migrate count is equal to its initialization value (e.g., the migrate count is not greater than zero), then the No branch of step 328 is taken and step 330 is performed. In step 330, calculation component 108 (see FIG. 1) determines the best enterprise configuration (i.e., optimized configuration) by saving the tentative version of the best enterprise configuration determined in the most recent performance of step 324 (see FIG. 3B) as the best enterprise configuration. In step 330, calculation component 108 stores the best enterprise configuration in memory or in a computer data storage unit.

In one embodiment, step 330 also includes the calculation component 108 (see FIG. 1) returning the best enterprise configuration to a user of system 100 (see FIG. 1). In one embodiment, step 330 includes the calculation component 108 (see FIG. 1) sending the best enterprise configuration to LPAR migration tool 118 (see FIG. 1).

In step 332, LPAR migration tool 118 migrates (i.e., moves) one or more LPARs to one or more servers, where each migration of an LPAR is a movement of the LPAR from a server that hosts the LPAR in the current configuration to another server that hosts the LPAR in the best enterprise configuration determined and saved in step 330. In step 334, the process of FIGS. 3A-3C ends.

Determining a Best Enterprise Configuration

In one embodiment, the loops in the process of FIGS. 3A-3C include the following steps to determine a best enterprise configuration:

1. Determine a tentative optimal configuration of a plurality of LPARs and a plurality of servers hosting the LPARs in an iteration of a first loop (see the loop starting at step 308 in FIG. 3A). The first loop includes iteratively evaluating a plurality of LPARs from a list of n LPARs in a second loop starting at step 310 (see FIG. 3A). The plurality of LPARs consists of the n LPARs. The list of n LPARs may be an ordered list in which the LPARs are in descending order according to the amounts of resources required by each LPAR in the list. The step of iteratively evaluating LPARs from the list of n LPARs includes evaluating an i-th LPAR from the list of n LPARs in an i-th iteration of the second loop, where $1 \le i \le n$. Evaluating the i-th LPAR in the i-th iteration includes the following sub-steps:
    a. Select an i-th LPAR from the list of n LPARs, where the i-th LPAR is in an i-th position in the list of LPARs, and wherein the i-th LPAR is hosted on a corresponding server of the plurality of servers in a current configuration (see step 310 in FIG. 3A). The current configuration is an initial configuration of the LPARs and the servers if i=1 or a tentative best enterprise configuration determined in a previous performance of the steps in this section if i>1.
    b. Identify an i-th set of one or more target servers from the plurality of servers based on each server of the i-th set of one or more target servers having a capacity of the available resources that is sufficient to satisfy an amount of the resources required by the i-th LPAR (see step 312 in FIG. 3A).
    c. Determine an i-th optimal placement of the i-th LPAR on a target server of the i-th set of one or more target servers (see step 314 in FIG. 3A). Determining the i-th optimal placement is based on the plurality of optimization characteristics. The i-th optimal placement is included in an i-th draft configuration of the plurality of LPARs and the plurality of servers.
    d. Determine that the target server of the i-th set of one or more target servers is not the server hosting the i-th LPAR in the current configuration (see the No branch of step 316 in FIG. 3B).
    e. In response to determining the target server of the i-th set of one or more target servers is not the server hosting the i-th LPAR in the current configuration, indicate a proposed migration of the i-th LPAR to the target server of the i-th set of one or more target servers and update a migrate count (see step 318 in FIG. 3B).
    f. Determine a total cost of the i-th draft configuration (see step 320 in FIG. 3B).
    g. Determine that the total cost of the i-th draft configuration is lower than a total cost of the current configuration and (if i>1) lower than one or more total costs of one or more other draft configurations resulting from 1 ... (i−1)-th iterations of the second loop (see the Yes branch of step 322).
    h. In response to determining that the total cost of the i-th draft configuration is lower than the total cost of the current configuration and (if i>1) lower than the one or more total costs of one or more other draft configurations resulting from the 1 ... (i−1)-th iterations, save the i-th draft configuration as an update to the tentative version of the optimal configuration (see step 324 in FIG. 3B).
2. If i<n, determine that one or more total costs of one or more (i.e., (i+1)-th ... n-th) draft configurations resulting from (i+1)-th ... n-th iterations of the second loop are greater than or equal to the total cost of the tentative version of the optimal configuration (see subsequent iteration(s) of the loop starting at step 310 in FIG. 3A).
3. Determine that one or more additional iterations of the first loop do not result in a total cost of a draft configuration being lower than the total cost of the tentative version of the optimal configuration (see the loop starting at step 308 in FIG. 3A).
4. In response to determining that one or more additional iterations of the first loop do not result in the total cost of a draft configuration being lower than the total cost of the tentative version of the optimal configuration, save the tentative version of the optimal configuration as a final version of the optimal configuration (i.e., a best enterprise configuration) of the plurality of LPARs and the plurality of servers (see step 330 in FIG. 3C).
5. Migrate one or more LPARs of the plurality of LPARs to one or more servers of the plurality of servers so that the plurality of LPARs and the plurality of servers are configured in the final version of the optimal configuration (see step 332 in FIG. 3C).

Shadow Costs

The cost of a system configuration can be granular and in some case changes only when a server can be removed after all the LPARs have been migrated away from it. However, the actual system configuration cost is insufficient to judge the quality of a solution (i.e., a configuration that is a candidate for the best enterprise configuration), because the burden of the cost of a new server is imposed on the first LPAR carried on the new server, and the cost of each subsequent LPAR is only the migration cost of the subsequent LPAR until the capacity of the server is exhausted and a new server is required. In order for the algorithm to converge on an optimal solution, one embodiment of the present invention provides a finer cost function granularity that reflects differentiable solutions, even when their actual system configuration costs (e.g., actual dollar costs) are the same. Therefore, in one embodiment, a shadow cost function is derived where the shadow cost generated by the shadow function reflects a cost per LPAR that decreases as the server's capacity is filled. The term "shadow cost" is used to distinguish this cost from the actual system configuration cost of the configuration provided by a solution. The embodiment that employs the shadow cost function discourages inefficiently used servers by increasing the shadow costs of inefficiently used servers, which increases the likelihood of removing LPARs from and/or diverting LPARs from migrating to the inefficiently used servers, so that the inefficiently used servers can eventually be removed. The shadow cost provides an indication of a given server configuration's attractiveness with respect to a given resource utilization.

In one embodiment, the shadow cost function is expressed as the sum of [(resource x allocated to LPAR/resources x in use by the server)*cost of the resource x in use by the server], where the sum is a summation over one or more types of resource x. Resource x may be processor, storage, environmentals, support costs or any other measurable characteristic. The shadow cost function identifies the cost of all resources allocated to the LPAR in proportion to the overall resources in use.

Figure 4:
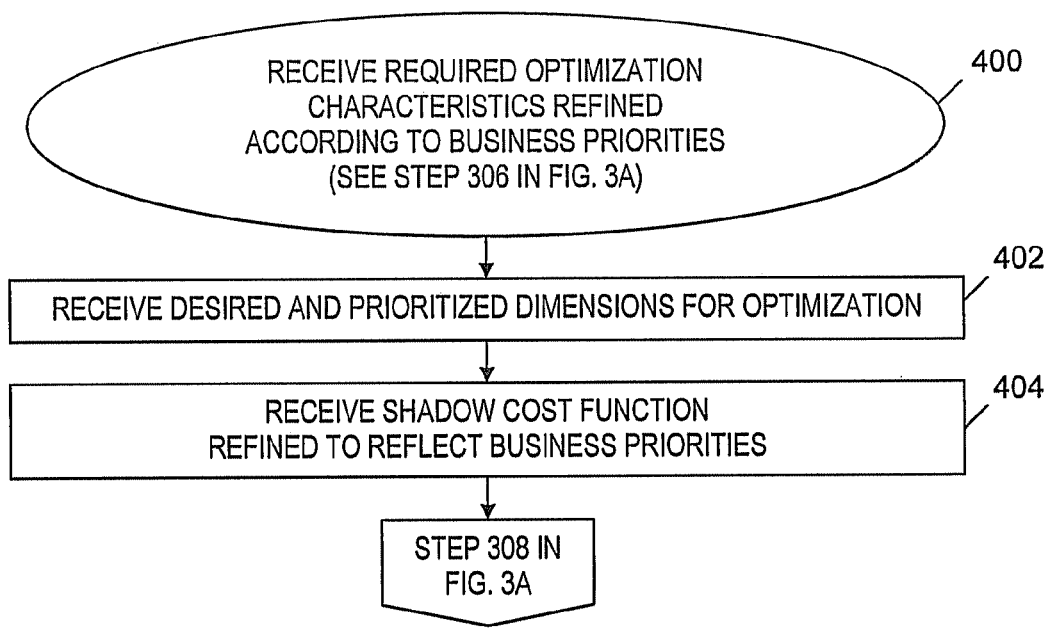
FIG. 4 is a flowchart of one embodiment of a process for receiving required optimization characteristics refined according to business priorities, where the process is included in the process of FIGS. 3A-3C, in accordance with embodiments of the present invention.
Figure 5:
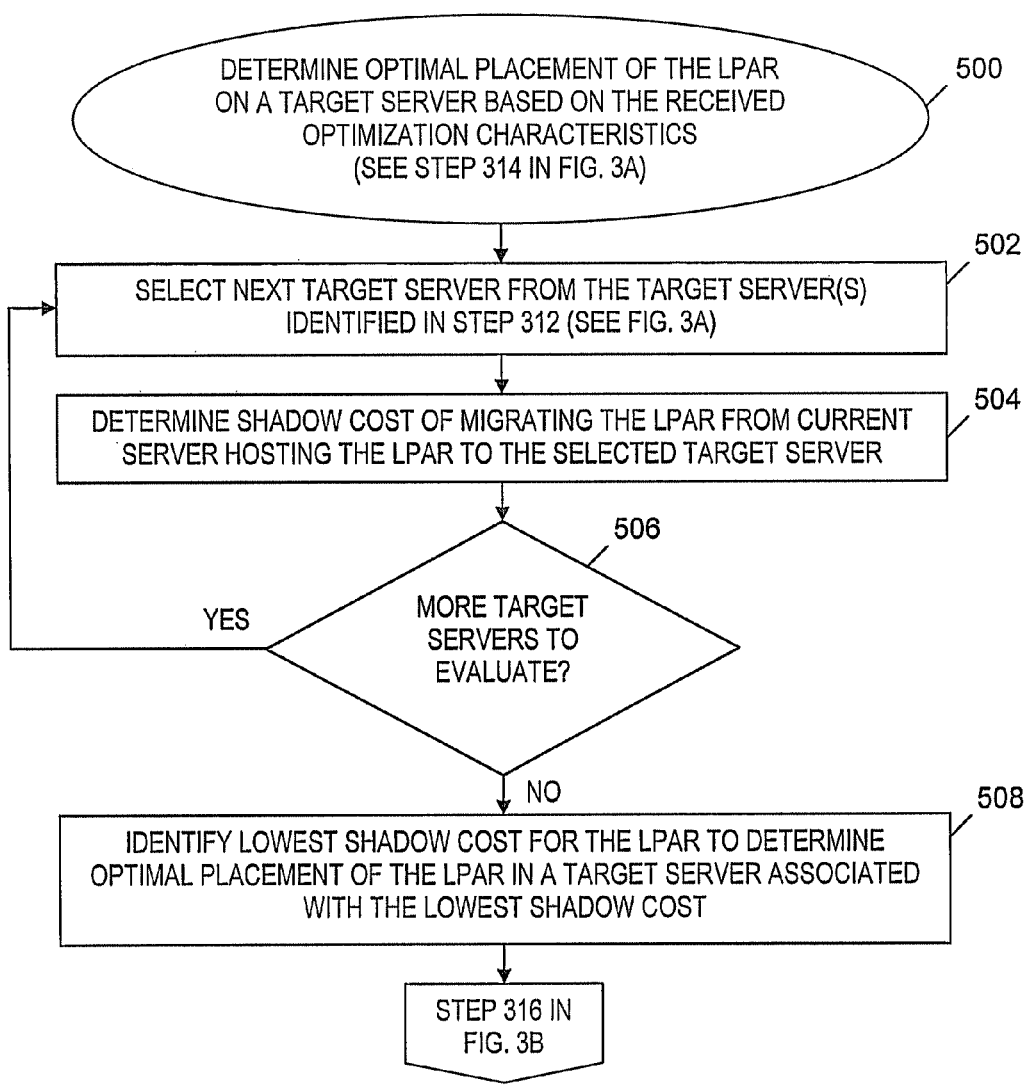
FIG. 5 is a flowchart of one embodiment of a process for determining an optimal placement of an LPAR on a target server based on optimization characteristics, where the process is included in the process of FIGS. 3A-3C, in accordance with embodiments of the present invention.

In one embodiment the processes of FIGS. 3A-3C, FIG. 4 and FIG. 5 determine the difference of the shadow costs between two solutions in each of one or more comparisons that determine the lowest shadow cost for a particular LPAR (see step 508 in FIG. 5). This difference of shadow costs consists of the upfront cost incurred by the migration of a LPAR from its current server j to a target server k, as well as the difference of cost shared with other LPARs on the new server minus the shared cost with other LPARs on the current server after the migration.

The upfront cost is the sum of the reconfiguration costs on both the new (i.e., target or receiving) server and the old server (a.k.a. current server or initial server; i.e., the server in the current configuration that hosts the LPAR), plus the migration cost of the LPAR from the current server to the new server. The reconfiguration cost is negative or null on the current server j since the reconfiguration involves a reduction of the resource capacity after the LPAR is removed from the current server (e.g., remove a memory module), and conversely the reconfiguration cost is positive or null on the receiving server. The migration cost is $(F_j+T_k)$ if j is the initial server of the LPAR, $(-T_j-F_k)$ if k is the initial server of the LPAR, and $(T_k-T_j)$ in all other cases, where $F_j$ and $F_k$ are the costs of migrating the LPAR from server j and server k, respectively, and where $T_j$ and $T_k$ are the costs of migrating the LPAR to server j and server k, respectively.

As used herein, the shadow cost is defined as the cost of used resources shared by an LPAR on a physical server. The shadow cost is further defined to be equal to the sum of the costs in a monetary unit (e.g., dollars) per shared resource (e.g., frame, memory, or CPU), divided by the amount of resources used by the LPAR. The sum of the costs in a shadow cost may also include one or more other costs, such as the resource footprint (floor space costs), the energy costs, the cost of support human resources (HR) requirements, etc.

To one skilled in the art it is readily apparent that additional dimensions can be used in the calculation of the shadow cost. For example, the energy costs of each server can be included in the shadow cost calculation to emphasize preferred servers that are energy efficient. As another example, floor space may be a lower priority dimension, such that the smallest total footprint that meets the other dimension requirements can be calculated.

FIG. 4 is a flowchart of one embodiment of a process for receiving required optimization characteristics refined according to business priorities, where the process is included in the process of FIGS. 3A-3C, in accordance with embodiments of the present invention. The process for receiving required optimization characteristics begins at step 400 and is included in step 306 in FIG. 3A. In step 402, configuration component 106 (see FIG. 1) receives prioritized dimensions to be used in the determination of the best enterprise configuration in the process of FIGS. 3A-3C. The received dimensions and the prioritization of the dimensions may be user-specified.

In step 404, configuration component 106 (see FIG. 1) receives a shadow cost function. In one embodiment, step 404 includes the configuration component 106 (see FIG. 1) receiving a refinement of a shadow cost function, where the refinement satisfies predefined criteria that specify business priorities. After step 404 is completed, step 308 in FIG. 3A is performed. See the discussion of FIG. 5 presented below for a description of shadow costs and how the optimal placement of LPARs utilizes shadow costs determined by employing the shadow cost function received in step 404.

FIG. 5 is a flowchart of one embodiment of a process for determining an optimal placement of an LPAR on a target server based on optimization characteristics, where the process is included in the process of FIGS. 3A-3C, in accordance with embodiments of the present invention. The process for determining an optimal placement of an LPAR on a target server based on optimization characteristics starts at step 500 and is included in step 314 in FIG. 3A.

In step 502, calculation component 108 (see FIG. 1) selects a next target server to be evaluated for the shadow cost determination in step 504. In step 502, the next target server is selected from the one or more target servers identified in step 312 (see FIG. 3A).

In step 504, calculation component 108 (see FIG. 1) employs the shadow cost function received in step 404 (see FIG. 4) to determine a shadow cost of migrating the LPAR selected in step 310 (see FIG. 3A) from the server hosting the LPAR in the current configuration to the target server selected in step 502 (a.k.a. the target server associated with the shadow cost).

If calculation component 108 (see FIG. 1) determines in inquiry step 506 that one or more target servers have yet to be selected in step 502 and used in the shadow cost determination in step 504, then the process of FIG. 5 repeats starting with a selection of a next target server from the identified target servers in step 502.

If calculation component 108 (see FIG. 1) determines in inquiry step 506 that all of the one or more target servers identified in step 312 (see FIG. 3A) have been selected in step 502 and have been used in shadow cost determinations in step 504, then step 508 is performed.

Although not shown in FIG. 5, calculation component 108 (see FIG. 1) also determines a shadow cost of the LPAR selected in step 310 (see FIG. 3A) if the LPAR remains in the current configuration without migrating to a target server.

In step 508, calculation component 108 (see FIG. 1) identifies the lowest shadow cost for the LPAR selected in step 310 (see FIG. 3A). That is, step 508 identifies the lowest shadow cost of the one or more shadow costs determined in all iterations of step 504 for a particular LPAR. Step 508 also includes calculation component 108 (see FIG. 1) determining the optimal placement of the LPAR selected in step 310 (see FIG. 3A) as being placed in and hosted by the target server associated with the lowest shadow cost. Following the completion of step 508, step 316 in FIG. 3B is performed.

Shadow Cost Example

Figure 6A:
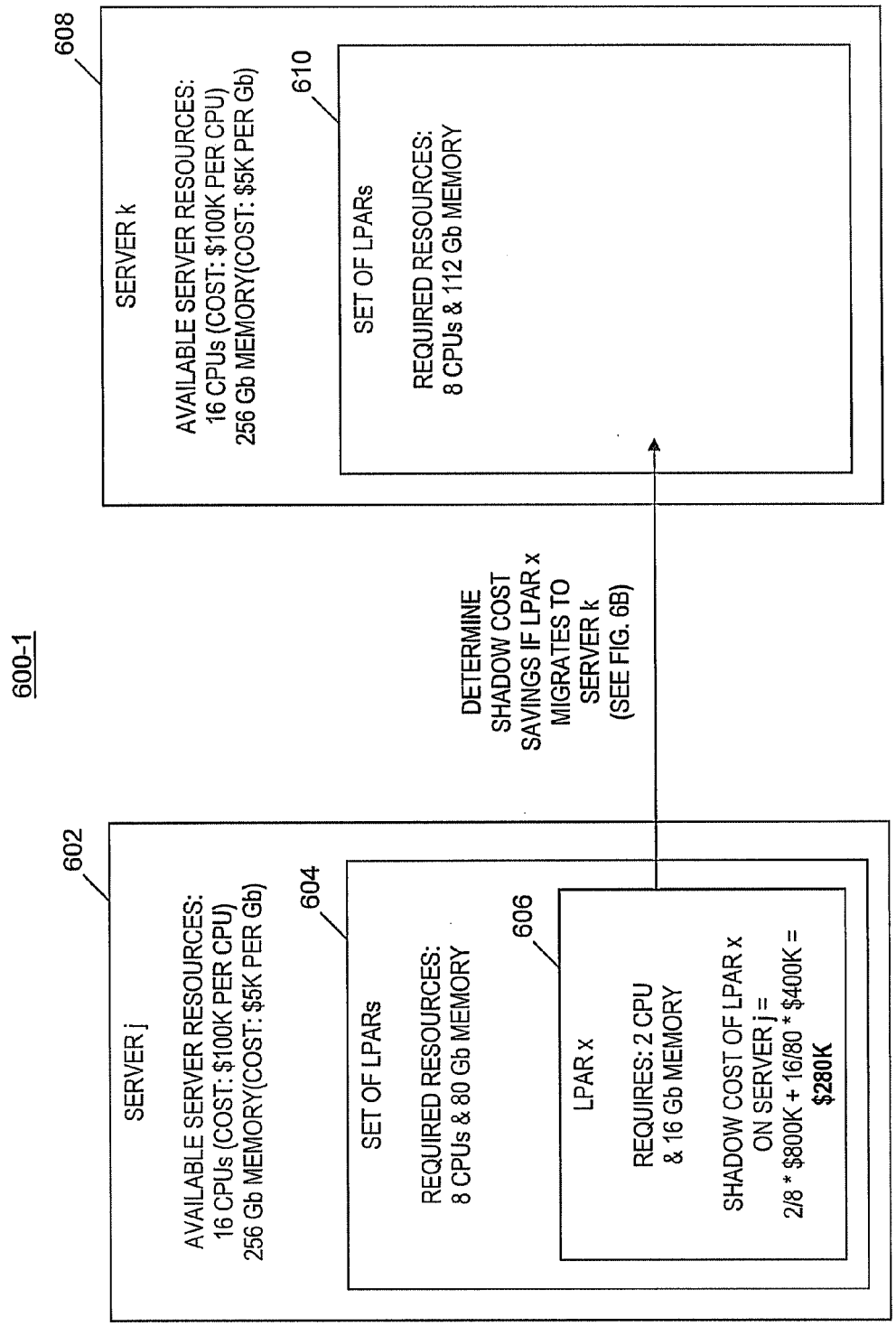
FIGS. 6A-6B depict an example of determining a net shadow cost savings of migrating an LPAR in the process of FIG. 5, in accordance with embodiments of the present invention.
Figure 6B:
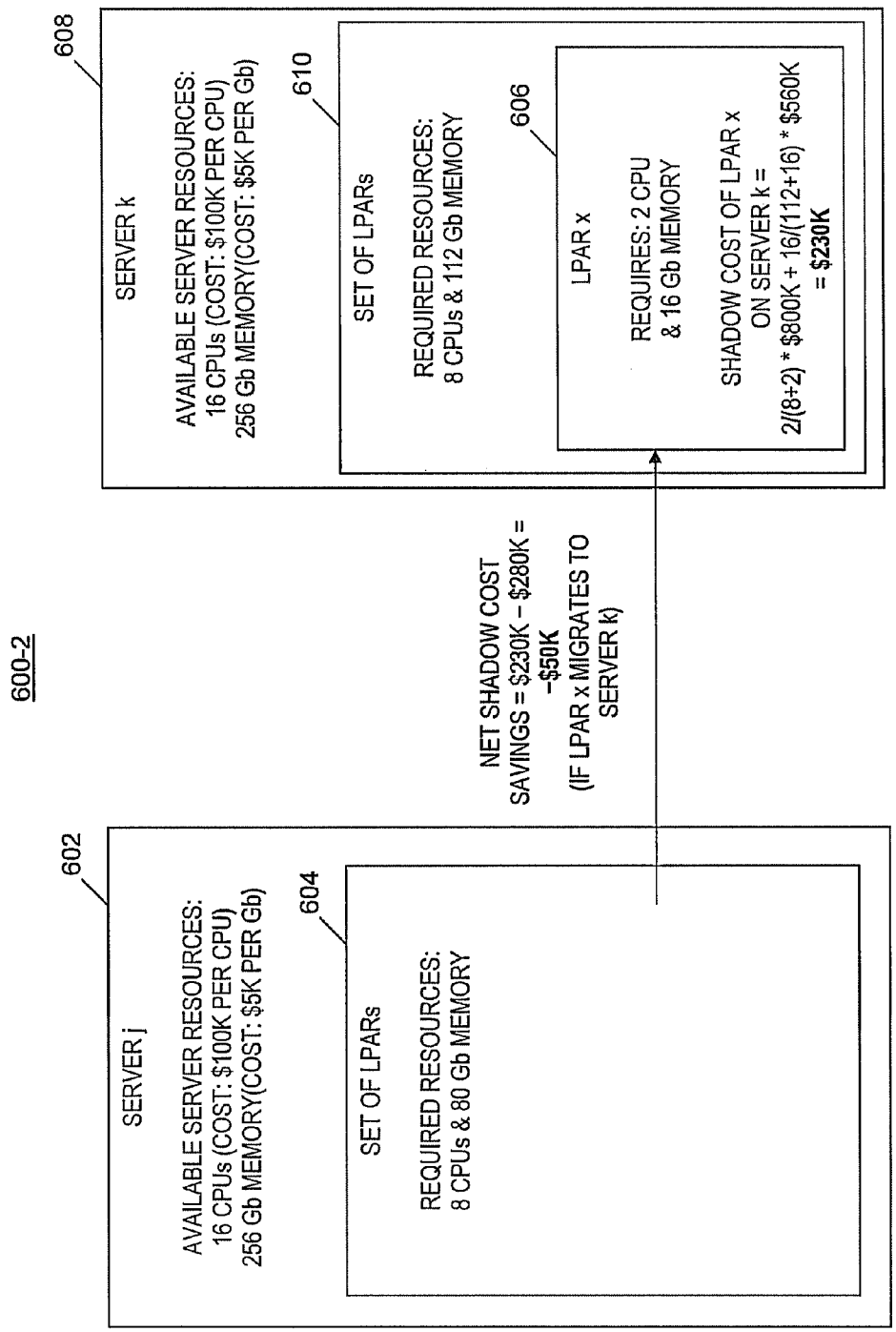

FIGS. 6A-6B depict an example of determining a net shadow cost savings of migrating an LPAR in the process of FIG. 5, in accordance with embodiments of the present invention. FIG. 6A depicts a first (i.e., pre-migration) view 600-1 of an example of determining a net shadow cost savings. FIG. 6A depicts a server 602 (i.e., server j), which includes a set of LPARs 604. The set of LPARs 604 includes an LPAR 606 (i.e., LPAR x). The example in FIG. 6A also includes a server 608 (i.e., server k), which includes a set of LPARs 610. First view 600-1 depicts an example of determining a shadow cost of an LPAR before migrating the LPAR in a process for determining an optimized configuration of LPARs and servers, where the optimization characteristics received in step 306 (see FIG. 3A) specify two optimization dimensions: CPU and memory.

In the first view 600-1 of the example, two servers, j and k, each have 16 CPUs as available resources, where each CPU costs $100,000. Servers j and k are each equipped with 256 Gb of memory, where each Gb of memory costs $5,000. The set of LPARs 604 hosted by server j use a total of 8 CPUs and 80 Gb of memory, and the set of LPARs 610 hosted by server k use a total of 8 CPUs and 112 Gb of memory. The amount of resources used by LPARs 604 by characteristic are for 8 CPUs*$100,000=$800,000 and for 80 Gb*$5,000=$400,000. The amount of resources used by LPARs 610 by characteristic are for 8 CPUs*$100,000=$800,000 and for 112 Gb*$5,000=$560,000. Since LPAR x hosted by server j requires 2 CPU and 16 Gb of memory, calculation component 108 (see FIG. 1) determines in the process of FIG. 5 that the shadow cost of LPAR x on server j is equal to 2/8*$800,000+16/80*$400,000=$280,000. First view 600-1 of the example needs to determine if a shadow cost savings occurs if LPAR x migrates to server k (see FIG. 6B).

FIG. 6B depicts a second (i.e., post-migration) view 600-2 of the aforementioned example that includes server 602 (i.e., server j), set of LPARs 604, server 608 (i.e., server k), and set of LPARs 610. Second view 600-2 also depicts LPAR 606 (i.e., LPAR x) after its migration from server j to server k. Since LPAR x hosted by server k requires 2 CPU and 16 Gb of memory, calculation component 108 (see FIG. 1) determines in step 504 (see FIG. 5) that the shadow cost of LPAR x on server k is equal to 2/(8+2)*$800,000+16/(112+16)*$560,000=$230,000. Therefore, calculation component 108 (see FIG. 1) determines a difference between shadow costs of 230,000−280,000=−50,000, or a net shadow cost savings of $50,000, as a result of LPAR x migrating from server j to server k. If no other iteration of steps 502, 504 and 506 in FIG. 5 for an evaluation of LPAR x determine a net shadow cost savings that exceeds $50,000, then step 508 (see FIG. 5) determines that $230,000 is the lowest shadow cost for LPAR x and the optimal placement of LPAR x is in the server k.

If an LPAR y (i.e., an LPAR of the same size as LPAR x) migrates from server j to server k after LPAR x migrates to server k as described above, the shadow cost savings for the LPAR y migration exceeds the aforementioned shadow cost savings for the LPAR x migration. That is, the shadow cost for the LPAR y migration is 2/(8+2+2)*$800,000+16/(112+16+16)*$560,000 and the difference between the shadow cost for the LPAR y migration and the shadow cost of the configuration after the aforementioned LPAR x migration is: (2/(8+2+2)*$800,000+16/(112+16+16)*$560,000)−(2/(8−2)*$800,000+16/(80−16)*$400,000=−$171,111 (approximately) or a net shadow cost savings of approximately $171,111. The increase in the net shadow cost savings for migrating LPAR y as compared to the net shadow cost savings for migrating LPAR x is because with subsequent migrations of LPARs from server j to server k, the resource utilization improves on server k and deteriorates on server j, thereby making server k more attractive cost-wise than server j.

To one skilled in the art it is readily apparent that additional dimensions can easily be added to the example depicted in FIGS. 6A-6B. For example, the energy costs of each server may be included in the shadow cost calculation to emphasize preferred servers that are energy efficient. As another example, floor space may be specified as a lower priority dimension, such that the smallest total footprint that meets the other dimension requirements can be calculated.

Integer Linear Programming Formulation

The present invention may utilize a technique for solving a multi-dimensional bin packing problem, where each dimension corresponds to a different resource type. In one embodiment, the Integer Linear Programming (ILP) formulation that may be used to determine an optimized configuration of LPARs and the servers that host the LPARs is as follows:

Given (inputs, constants):

$\lambda$ Set of LPARs (1)

$\phi$ Set of host (physical) server frames (2)

$\tau$ Set of time intervals over which optimization is being performed (3)

$\rho$ Set of resource types (e.g., CPU, memory, power, floor space, equipment cost (lease), etc.) (4)

$\mu_{jr}$ Set of possible resource configurations for resource of type r on server j∈φ One of the configurations is the initial configuration which has cost 0. The costs of other configurations are relative to the initial configuration and can be negative or positive. See $X_u$ presented below. (5)

$\alpha_{rijt}$ Normalized requirement of resource type r ∈ρ of LPAR i∈λ on server j∈φ during time interval t∈τ. (6)

$a_{ij}$ 1 if LPAR i∈λ is initially on server j∈φ, and 0 otherwise. (7)

$F_j$ cost of migrating any LPAR from host j∈φ (8)

$T_j$ cost of migrating any LPAR to host j∈φ (9)

$M_{ij}$ From (6)-(9) the cost of migrating LPAR i∈λ to server j∈φ is deducted. This cost applies if and only if $a_{ij}=0$ and $x_{ij}=1$. That is, the LPAR has to be moved to incur a migration cost. Therefore:

$M_{ij}=0, \forall i\in\lambda, \forall j\in\{\phi|a_{ij}=1\}$ $M_{ij}=T_j+F_k, \forall(i,j,k)\in\{\phi\times\phi\times\lambda|a_{ij}=0 \wedge a_{ik}=1\}$ (10)

$C_j$ operating cost of server j∈φ (11)

$X_u$ cost of configuring resource type r∈ρ with u∈$\mu_{jr}$ on server j∈φ( (12)

$R_u$ normalized size of resource r∈ρ using configuration u∈$\mu_{jr}$ on server j∈φ (13)

$W_{jr}$ normalized reserved size of resource type r∈ρ on server j∈φ (14).

This resource is reserved for future growths on server j.

Find (output, variables):

$x_{ij}$ 1 if LPAR i∈λ is (re)located on server j∈φ, and 0 otherwise (15)

$y_u$ 1 if resource r∈ρ is configured with u∈$\mu_{jr}$ on server j∈φ, and 0 otherwise (16)

$m_j$ 1 if server j∈φ is used by at least one LPAR, and 0 otherwise. (17)

That minimizes:

$$\sum_{j\in\phi} m_j C_j + \sum_{i\in\lambda, j\in\phi} M_{ij} x_{ij} + \sum_{j\in\phi, r\in\rho, u\in\mu_{jr}} X_u y_u \quad (18)$$

Such that:

$$\sum_{j\in\phi} x_{ij} \geq 1 \quad \forall i \in \lambda \quad (19)$$

$$\sum_{u\in\mu_{jr}} y_u \geq 1 \quad \forall j \in \phi, \forall r \in \rho \quad (20)$$

$$\sum_{u\in\mu_{jr}} R_u y_u - \sum_{i\in\lambda} x_{ij}\alpha_{ijrt} - W_{jr} \geq 0 \quad \forall j \in \phi, \forall r \in \rho, \forall t \in \tau \quad (21)$$

$$m_j - x_{ij} \geq 0 \quad \forall i \in \lambda, \forall j \in \phi \quad (22)$$

$$x_{ij} \in \{0,1\} \quad \forall i \in \lambda, \forall j \in \phi \quad (23)$$

$$y_u \in \{0,1\} \quad \forall j \in \phi, \forall r \in \rho, \forall u \in \mu_{jr} \quad (24)$$

$$0 \leq m_j \leq 1 \quad \forall j \in \phi \quad (25)$$

Explanations for parameters listed above for the ILP include:
(18) Minimize: the sum of the cost of servers used for the collocation, plus the sum of migration costs, plus the sum of resource configuration costs on each server.
(19) Each LPAR must be allocated to one server.
(20) Each server must have one resource configuration.
(21) Sum of collocated LPAR resource utilizations must not exceed each server's resource capacity in each time interval, for each resource type.
(22) Each server is used if there is at least one LPAR on the server.
(23) If a server has at least one LPAR on the server, then it can be moved. That is, every i is a member of lambda and every j is a member of theta.
(24) If the server has the configuration, then the server belongs to the set of physical frames, having the resource types, with the set of all possible resource types.
(25) The server has to be used by at least one LPAR and belong to the set of all possible servers.

In the ILP formulation presented above, all resource requirements and capacities are normalized. For instance, the CPU normalization is computed according to a performance ranking value (e.g., a Relative Performance Estimate 2 value provided by Ideas International located in Hornsby, Australia) of each server j. If some servers do not support fractional resource sizes, their sizes are rounded up to the next supported fraction on that server. The formulation uses a server-dependent resource utilizations $\alpha_{rijt}$ for each LPAR, allowing the expression of server-specific capabilities.

Computer System

Figure 7:
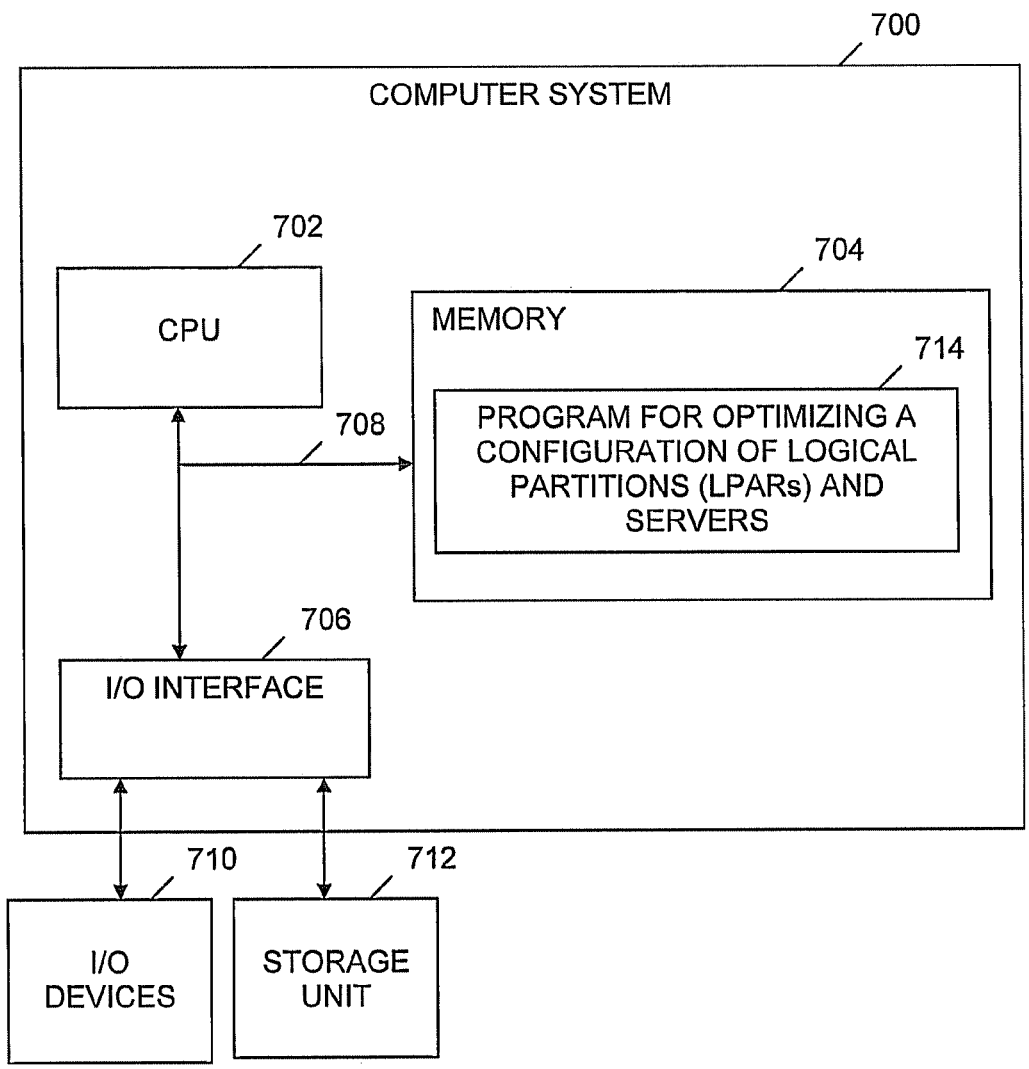
FIG. 7 is a computer system that is included in the system of FIG. 1 and that implements the processes of FIGS. 2 and 3A-3C, in accordance with embodiments of the present invention.

FIG. 7 is a computer system that is included in the system of FIG. 1 and that implements the processes of FIGS. 2 and 3A-3C, in accordance with embodiments of the present invention. Computer system 700 in FIG. 7 may also implement the processes of FIG. 4 and FIG. 5. Computer system 700 generally comprises a central processing unit (CPU) 702, a memory 704, an input/output (I/O) interface 706, and a bus 708. Further, computer system 700 is coupled to I/O devices 710 and a computer data storage unit 712. CPU 702 performs computation and control functions of computer system 700. CPU 702 may comprise a single processing unit, or be distributed across one or more processing units in one or more locations (e.g., on a client and server). In one embodiment, computer system 700 is computer system 102 (see FIG. 1).

Memory 704 may comprise any known computer readable storage medium, which is described below. In one embodiment, cache memory elements of memory 704 provide temporary storage of at least some program code (e.g., program code 714) in order to reduce the number of times code must be retrieved from bulk storage while instructions of the program code are carried out. Moreover, similar to CPU 702, memory 704 may reside at a single physical location, comprising one or more types of data storage, or be distributed across a plurality of physical systems in various forms. Further, memory 704 can include data distributed across, for example, a local area network (LAN) or a wide area network (WAN).

I/O interface 706 comprises any system for exchanging information to or from an external source. I/O devices 710 comprise any known type of external device, including a display device (e.g., monitor), keyboard, mouse, printer, speakers, handheld device, facsimile, etc. Bus 708 provides a communication link between each of the components in computer system 700, and may comprise any type of transmission link, including electrical, optical, wireless, etc.

I/O interface 706 also allows computer system 700 to store and retrieve information (e.g., data or program instructions such as program code 714) from an auxiliary storage device such as computer data storage unit 712 or another computer data storage unit (not shown). Computer data storage unit 712 may comprise any known computer readable storage medium, which is described below. For example, computer data storage unit 712 may be a non-volatile data storage device, such as a magnetic disk drive (i.e., hard disk drive) or an optical disc drive (e.g., a CD-ROM drive which receives a CD-ROM disk).

Memory 704 may include computer program code 714 that provides the logic for determining an optimized configuration of LPARs and servers that host the LPARs (e.g., the process of FIG. 2 or FIGS. 3A-3C). Further, memory 704 may include other systems not shown in FIG. 7, such as an operating system (e.g., Linux) that runs on CPU 702 and provides control of various components within and/or connected to computer system 700.

Memory 704, storage unit 712, and/or one or more other computer data storage units (not shown) that are coupled to computer system 700 may store configuration data file 112 (see FIG. 1), optimization characteristics data file 114 (see FIG. 1), and optimized configuration of LPARs and servers 116 (see FIG. 1). Configuration data file 112 (see FIG. 1), optimization characteristics data file 114 (see FIG. 1), and/or optimized configuration of LPARs and servers 116 (see FIG. 1) may be stored, for example, in a database residing in data storage unit 712 or one or more other computer data storage units (not shown).

As will be appreciated by one skilled in the art, the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system" (e.g., system 100 in FIG. 1 or computer system 700). Furthermore, an embodiment of the present invention may take the form of a computer program product embodied in one or more computer readable medium(s) (e.g., memory 704 or computer data storage unit 712) having computer readable program code (e.g., program code 714) embodied or stored thereon.

Any combination of one or more computer readable medium(s) (e.g., memory 704 and computer data storage unit 712) may be utilized. The computer readable medium may be a computer readable signal medium or a computer readable storage medium (i.e., computer readable storage device). A computer readable storage device may be, for example, but not limited to, an electronic, magnetic, electromagnetic, or semiconductor system, apparatus, device or any suitable combination of the foregoing. A non-exhaustive list of more specific examples of the computer-readable storage device includes: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can contain or store a program (e.g., program 714) for use by or in connection with a system, apparatus, or device for carrying out instructions. Each of the terms "computer readable storage device" and "computer readable storage medium" does not include a signal propagation medium such as a copper cable, optical fiber or a wireless transmission medium.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with a system, apparatus, or device for carrying out instructions.

Program code (e.g., program code 714) embodied on a computer readable medium may be transmitted using any appropriate medium, including but not limited to wireless, wireline, optical fiber cable, RF, etc., or any suitable combination of the foregoing.

Computer program code (e.g., program code 714) for carrying out operations for aspects of the present invention may be written in any combination of one or more programming languages, including an object oriented programming language such as Java®, Smalltalk, C++ or the like and conventional procedural programming languages, such as the "C" programming language or similar programming languages. Instructions of the program code may be carried out entirely on a user's computer, partly on the user's computer, as a stand-alone software package, partly on the user's computer and partly on a remote computer or entirely on the remote computer or server, where the aforementioned user's computer, remote computer and server may be, for example, computer system 700 or another computer system (not shown) having components analogous to the components of computer system 700 included in FIG. 7. In the latter scenario, the remote computer may be connected to the user's computer through any type of network (not shown), including a LAN or a WAN, or the connection may be made to an external computer (e.g., through the Internet using an Internet Service Provider).

Aspects of the present invention are described herein with reference to flowchart illustrations (e.g., FIG. 2, FIGS. 3A-3C, FIG. 4 and FIG. 5) and/or block diagrams of methods, apparatus (systems) (e.g., FIG. 1 and FIG. 7), and computer program products according to embodiments of the invention. It will be understood that each block of the flowchart illustrations and/or block diagrams, and combinations of blocks in the flowchart illustrations and/or block diagrams, can be implemented by computer program instructions (e.g., program code 714). These computer program instructions may be provided to a processor (e.g., CPU 702) of a general purpose computer, special purpose computer, or other programmable data processing apparatus to produce a machine, such that the instructions, which are carried out via the processor of the computer or other programmable data processing apparatus, create means for implementing the functions/acts specified in the flowchart and/or block diagram block or blocks.

These computer program instructions may also be stored in a computer readable medium (e.g., memory 704 or computer data storage unit 712) that can direct a computer (e.g., computer system 700), other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer (e.g., computer system 700), other programmable data processing apparatus, or other devices to cause a series of operational steps to be performed on the computer, other programmable apparatus, or other devices to produce a computer implemented process such that the instructions which are carried out on the computer, other programmable apparatus, or other devices provide processes for implementing the functions/acts specified in the flowchart and/or block diagram block or blocks.

Any of the components of an embodiment of the present invention can be deployed, managed, serviced, etc. by a service provider that offers to deploy or integrate computing infrastructure with respect to the process of determining an optimal configuration of LPARs and servers that host the LPARs. Thus, an embodiment of the present invention discloses a process for supporting computer infrastructure, comprising integrating, hosting, maintaining and deploying computer-readable code (e.g., program code 714) into a computer system (e.g., computer system 700), wherein the code in combination with the computer system is capable of performing a process of determining an optimal configuration of LPARs and servers that host the LPARs.

In another embodiment, the invention provides a business method that performs the process steps of the invention on a subscription, advertising and/or fee basis. That is, a service provider, such as a Solution Integrator, can offer to create, maintain, support, etc. a process of determining an optimal configuration of LPARs and servers that host the LPARs. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flowcharts in FIG. 2, FIGS. 3A-3C, FIG. 4 and FIG. 5 and the block diagrams in FIG. 1 and FIG. 7 illustrate the architecture, functionality, and operation of possible implementations of systems, methods, and computer program products according to various embodiments of the present invention. In this regard, each block in the flowchart or block diagrams may represent a module, segment, or portion of code (e.g., program code 714), which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method of optimizing a configuration of a plurality of logical partitions (LPARs) and a plurality of server computer systems (servers) that host the LPARs, said method comprising:
   a processor of a computer determining an optimal placement of an LPAR onto a target server, said LPAR included in said plurality of LPARs and being hosted on a current server, and said target server and said current server being different servers included in said plurality of servers, wherein said determining said optimal placement includes:
      said computer determining a plurality of shadow costs, each shadow cost being a shadow cost of migrating said LPAR from said current server to a respective server included in said plurality of servers, each shadow cost including an amount of a computing resource allocated to said LPAR multiplied by a cost per said computing resource in use on said respective server divided by an amount of said computing resource in use by said respective server;
      identifying a lowest shadow cost included in the plurality of shadow costs;
      determining a target server included in said plurality of servers to which a migration of said LPAR specifies said lowest shadow cost; and
      identifying said optimal placement as a placement of said LPAR onto said target server; and
   migrating one or more LPARs of said plurality of LPARs to one or more servers of said plurality of servers, wherein a result of said migrating is said LPAR being in said optimal placement.

2. The method of claim 1, wherein said determining said optimal placement of said LPAR is included in a multidimensional bin packing methodology that employs a plurality of dimensions, wherein said dimensions are requirements of resource types of a plurality of resource types included in configuration data that describes an enterprise configuration of said plurality of LPARs and said plurality of servers, and wherein said plurality of resource types specifies a plurality of resources required by said plurality of servers.

3. The method of claim 2, wherein said plurality of resources is constrained by a plurality of capacity constraints, wherein said determining said optimal placement of said LPAR includes performing vector packing in said multidimensional bin packing methodology, and wherein said performing vector packing includes satisfying said capacity constraints individually on each resource type of said plurality of resource types.

4. The method of claim 2, wherein said determining said optimal placement of said LPAR includes performing rectangular packing in said multidimensional bin packing methodology, wherein said performing rectangular packing includes representing said plurality of resource types as a plurality of sides of an n-dimensional cube and fitting a plurality of cubes in a cube without overlapping any cubes of said plurality of cubes, wherein said plurality of cubes is formed by utilizations of said plurality of resources by multiple LPARs of said plurality of LPARs, and wherein said cube is formed by a server of said plurality of servers receiving said multiple LPARs.

5. A computer-implemented method of determining an optimal configuration of a plurality of logical partitions (LPARs) and a plurality of server computer systems (servers) that host the LPARs, said method comprising:
   receiving a first specification of said plurality of LPARs and a plurality of resources required by each LPAR;
   receiving a second specification of said plurality of servers and a plurality of available resources provided by said plurality of servers in a current configuration of said plurality of LPARs and said plurality of servers;
   receiving a plurality of optimization characteristics;
   a processor of a computing system determining a draft configuration of said plurality of LPARs and said plurality of servers is a tentative version of said optimal configuration of said plurality of LPARs and said plurality of servers by performing an iteration of a first loop, wherein said performing said iteration of said first loop includes iteratively evaluating LPARs from a list of n LPARs in a second loop, and wherein said tentative version of said optimal configuration has a tentative final total cost;
   determining no other draft configuration resulting from one or more additional iterations of said second loop or one or more additional iterations of said first loop has a draft total cost less than said tentative final total cost of said tentative version of said optimal configuration;
   in response to said determining no other draft configuration has said draft total cost less than said tentative final total cost, saving said tentative version of said optimal configuration as a final version of said optimal configuration of said plurality of LPARs and said plurality of servers;
   migrating one or more LPARs of said plurality of LPARs to one or more servers of said plurality of servers so that said plurality of LPARs and said plurality of servers are configured in said final version of said optimal configuration; and
   initializing a migrate count to an initialization value prior to said determining said draft configuration is said tentative version of said optimal configuration, wherein said plurality of LPARs consists of said n LPARs, and wherein said iteratively evaluating LPARs from said list of n LPARs includes evaluating an i-th LPAR from said list of n LPARs in an i-th iteration of said second loop, wherein $1 \le i \le n$, and wherein said evaluating said i-th LPAR includes:
      selecting an i-th LPAR from said list of n LPARs, wherein said i-th LPAR is in an i-th position in said list of LPARs, and wherein said i-th LPAR is hosted on a corresponding server of said plurality of servers in said current configuration;

identifying an i-th set of one or more target servers from said plurality of servers based on each server of said i-th set of one or more target servers having a capacity of said available resources that is sufficient to satisfy an amount of said resources required by said i-th LPAR;

determining an i-th optimal placement of said i-th LPAR on a target server of said i-th set of one or more target servers, wherein said determining said i-th optimal placement is based on said plurality of optimization characteristics, wherein said i-th optimal placement is included in an i-th draft configuration of said plurality of LPARs and said plurality of servers, and wherein said draft configuration of said plurality of LPARs and said plurality of servers is said i-th draft configuration;

determining said target server of said i-th set of one or more target servers is not said corresponding server hosting said i-th LPAR;

in response to said determining said target server of said i-th set of one or more target servers is not said corresponding server hosting said i-th LPAR, indicating a migration of said i-th LPAR to said target server of said i-th set of one or more target servers and updating said migrate count;

determining a total cost of said i-th draft configuration;

determining said total cost of said i-th draft configuration is less than a total cost of said current configuration and less than one or more total costs of one or more other draft configurations resulting from 1 . . . (i−1)-th iterations of said second loop; and in response to said determining said total cost of said i-th draft configuration is less than said total cost of said current configuration and less than said one or more total costs of one or more other draft configurations resulting from said 1 . . . (i−1)-th iterations, saving said i-th draft configuration as said tentative version of said optimal configuration and saving said total cost of said i-th draft configuration as said tentative final total cost of said tentative version of said optimal configuration.

6. The method of claim 5 further comprising, prior to said iteratively evaluating LPARs, sorting said plurality of LPARs into said list of n LPARs in a descending order according to amounts of said resources required by each LPAR of said n LPARs.

7. The method of claim 5, wherein said evaluating said i-th LPAR further includes:

determining m shadow costs of migrating said i-th LPAR from said corresponding server of said plurality of servers in said current configuration to each server of said i-th set of one or more target servers consisting of m target servers; and identifying a least shadow cost of said m shadow costs, wherein said determining said i-th optimal placement of said i-th LPAR on said target server of said i-th set of one or more target servers is based on said least shadow cost being a shadow cost of migrating said i-th LPAR from said corresponding server in said current configuration to said target server of said i-th set of one or more target servers.

8. The method of claim 5, wherein said determining no other draft configuration resulting from said one or more additional iterations of said second loop or said one or more additional iterations of said first loop has said draft total cost less than said tentative final total cost of said tentative version of said optimal configuration includes determining that one or more total costs of one or more draft configurations resulting from (i+1)-th . . . n-th iterations of said second loop are greater than or equal to said tentative final total cost of said tentative version of said optimal configuration.

9. A computer program product, comprising a computer readable storage device having a computer readable program code stored in the computer readable storage device, said computer readable program code containing instructions carried out by a processor of a computer system to implement a method of determining an optimal configuration of a plurality of logical partitions (LPARs) and a plurality of server computer systems (servers) that host the LPARs, said method comprising:

receiving a first specification of said plurality of LPARs and a plurality of resources required by each LPAR;

receiving a second specification of said plurality of servers and a plurality of available resources provided by said plurality of servers in a current configuration of said plurality of LPARs and said plurality of servers;

receiving a plurality of optimization characteristics;

determining a draft configuration of said plurality of LPARs and said plurality of servers is a tentative version of said optimal configuration of said plurality of LPARs and said plurality of servers by performing an iteration of a first loop, wherein said performing said iteration of said first loop includes iteratively evaluating LPARs from a list of n LPARs in a second loop, and wherein said tentative version of said optimal configuration has a tentative final total cost;

determining no other draft configuration resulting from one or more additional iterations of said second loop or one or more additional iterations of said first loop has a draft total cost less than said tentative final total cost of said tentative version of said optimal configuration;

in response to said determining no other draft configuration has said draft total cost less than said tentative final total cost, saving said tentative version of said optimal configuration as a final version of said optimal configuration of said plurality of LPARs and said plurality of servers;

migrating one or more LPARs of said plurality of LPARs to one or more servers of said plurality of servers so that said plurality of LPARs and said plurality of servers are configured in said final version of said optimal configuration; and initializing a migrate count to an initialization value prior to said determining said draft configuration is said tentative version of said optimal configuration, wherein said plurality of LPARs consists of said n LPARs, and wherein said iteratively evaluating LPARs from said list of n LPARs includes evaluating an i-th LPAR from said list of n LPARs in an i-th iteration of said second loop, wherein 1 ≤i ≤n, and wherein said evaluating said i-th LPAR includes:

selecting an i-th LPAR from said list of n LPARs, wherein said i-th LPAR is in an i-th position in said list of LPARs, and wherein said i-th LPAR is hosted on a corresponding server of said plurality of servers in said current configuration;

identifying an i-th set of one or more target servers from said plurality of servers based on each server of said i-th set of one or more target servers having a capacity of said available resources that is sufficient to satisfy an amount of said resources required by said i-th LPAR;

said computer system determining an i-th optimal placement of said i-th LPAR on a target server of said i-th set of one or more target servers, wherein said determining said i-th optimal placement is based on said plurality of optimization characteristics, wherein said i-th optimal placement is included in an i-th draft configuration of said plurality of LPARs and said plurality of servers, and wherein said draft configuration of said plurality of LPARs and said plurality of servers is said i-th draft configuration;

determining said target server of said i-th set of one or more target servers is not said corresponding server hosting said i-th LPAR;

in response to said determining said target server of said i-th set of one or more target servers is not said corresponding server hosting said i-th LPAR, indicating a migration of said i-th LPAR to said target server of said i-th set of one or more target servers and updating said migrate count;

determining a total cost of said i-th draft configuration;

determining said total cost of said i-th draft configuration is less than a total cost of said current configuration and less than one or more total costs of one or more other draft configurations resulting from 1 . . . (i−1)-th iterations of said second loop; and in response to said determining said total cost of said i-th draft configuration is less than said total cost of said current configuration and less than said one or more total costs of one or more other draft configurations resulting from said 1 . . . (i−1)-th iterations, saving said i-th draft configuration as said tentative version of said optimal configuration and saving said total cost of said i-th draft configuration as said tentative final total cost of said tentative version of said optimal configuration.

10. A process for supporting computing infrastructure, said process comprising providing at least one support service for at least one of creating, integrating, hosting, maintaining, and deploying computer-readable code in a computing system comprising a processor, wherein said processor carries out instructions of said code to cause the computing system to specify a method of determining an optimal configuration of a plurality of logical partitions (LPARs) and a plurality of server computer systems (servers) that host the LPARs, said method comprising:

receiving a first specification of said plurality of LPARs and a plurality of resources required by each LPAR;

receiving a second specification of said plurality of servers and a plurality of available resources provided by said plurality of servers in a current configuration of said plurality of LPARs and said plurality of servers; and receiving a plurality of optimization characteristics;

determining a draft configuration of said plurality of LPARs and said plurality of servers is a tentative version of said optimal configuration of said plurality of LPARs and said plurality of servers by performing an iteration of a first loop, wherein said performing said iteration of said first loop includes iteratively evaluating LPARs from a list of n LPARs in a second loop, and wherein said tentative version of said optimal configuration has a tentative final total cost;

determining no other draft configuration resulting from one or more additional iterations of said second loop or one or more additional iterations of said first loop has a draft total cost less than said tentative final total cost of said tentative version of said optimal configuration;

in response to said determining no other draft configuration has said draft total cost less than said tentative final total cost, saving said tentative version of said optimal configuration as a final version of said optimal configuration of said plurality of LPARs and said plurality of servers;

migrating one or more LPARs of said plurality of LPARs to one or more servers of said plurality of servers so that said plurality of LPARs and said plurality of servers are configured in said final version of said optimal configuration; and initializing a migrate count to an initialization value prior to said determining said draft configuration is said tentative version of said optimal configuration, wherein said plurality of LPARs consists of said n LPARs, and wherein said iteratively evaluating LPARs from said list of n LPARs includes evaluating an i-th LPAR from said list of n LPARs in an i-th iteration of said second loop, wherein $1 \le i \le n$, and wherein said evaluating said i-th LPAR includes:

selecting an i-th LPAR from said list of n LPARs, wherein said i-th LPAR is in an i-th position in said list of LPARs, and wherein said i-th LPAR is hosted on a corresponding server of said plurality of servers in said current configuration;

identifying an i-th set of one or more target servers from said plurality of servers based on each server of said i-th set of one or more target servers having a capacity of said available resources that is sufficient to satisfy an amount of said resources required by said i-th LPAR;

determining an i-th optimal placement of said i-th LPAR on a target server of said i-th set of one or more target servers, wherein said determining said i-th optimal placement is based on said plurality of optimization characteristics, wherein said i-th optimal placement is included in an i-th draft configuration of said plurality of LPARs and said plurality of servers, and wherein said draft configuration of said plurality of LPARs and said plurality of servers is said i-th draft configuration;

determining said target server of said i-th set of one or more target servers is not said corresponding server hosting said i-th LPAR;

in response to said determining said target server of said i-th set of one or more target servers is not said corresponding server hosting said i-th LPAR, indicating a migration of said i-th LPAR to said target server of said i-th set of one or more target servers and updating said migrate count;

determining a total cost of said i-th draft configuration;

determining said total cost of said i-th draft configuration is less than a total cost of said current configuration and less than one or more total costs of one or more other draft configurations resulting from 1 . . . (i−1)-th iterations of said second loop; and in response to said determining said total cost of said i-th draft configuration is less than said total cost of said current configuration and less than said one or more total costs of one or more other draft configurations resulting from said 1 . . . (i−1)-th iterations, saving said i-th draft configuration as said tentative version of said optimal configuration and saving said total cost of said i-th draft configuration as said tentative final total cost of said tentative version of said optimal configuration.

* * * * *